United States Patent
Kim et al.

(10) Patent No.: US 10,056,082 B2
(45) Date of Patent: Aug. 21, 2018

(54) MOBILE TERMINAL AND METHOD OF CONTROLLING THEREFOR

(71) Applicant: LG ELECTRONICS INC., Seoul (KR)

(72) Inventors: Yongjae Kim, Seoul (KR); Minjoo Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 14/976,996

(22) Filed: Dec. 21, 2015

(65) Prior Publication Data
US 2016/0182709 A1 Jun. 23, 2016

(30) Foreign Application Priority Data
Dec. 22, 2014 (KR) .................. 10-2014-0186099

(51) Int. Cl.
| | |
|---|---|
| *H04M 1/00* | (2006.01) |
| *G10L 15/26* | (2006.01) |
| *H04W 4/14* | (2009.01) |
| *H04W 4/18* | (2009.01) |
| *H04M 1/725* | (2006.01) |
| *G06F 3/0488* | (2013.01) |
| *H04W 88/04* | (2009.01) |

(52) U.S. Cl.
CPC .......... *G10L 15/26* (2013.01); *G06F 3/04883* (2013.01); *G06F 3/04886* (2013.01); *H04M 1/72552* (2013.01); *H04W 4/14* (2013.01); *H04W 4/18* (2013.01); *G06F 2203/0381* (2013.01); *H04M 1/72566* (2013.01); *H04M 2250/22* (2013.01); *H04M 2250/74* (2013.01); *H04W 88/04* (2013.01)

(58) Field of Classification Search
CPC ....... G06F 2203/0381; G06F 17/30884; G06F 3/0481; G06F 3/167; G10L 15/18; G10L 15/183; G10L 15/1822
USPC ...................................... 455/556.2
See application file for complete search history.

(56) References Cited

U.S. PATENT DOCUMENTS

| | | | | |
|---|---|---|---|---|
| 2012/0265528 A1* | 10/2012 | Gruber | .................... | G10L 15/18 704/235 |
| 2013/0297317 A1 | 11/2013 | Lee et al. | | |
| 2014/0074483 A1* | 3/2014 | van Os | .................... | G10L 15/22 704/275 |
| 2014/0075375 A1* | 3/2014 | Hwang | ................. | G06F 3/0482 715/784 |

(Continued)

FOREIGN PATENT DOCUMENTS

EP 2 144 140 A2 1/2010

*Primary Examiner* — Ajibola Akinyemi
(74) *Attorney, Agent, or Firm* — Birch, Stewart, Kolasch & Birch, LLP

(57) ABSTRACT

A mobile terminal including a wireless communication unit configured to wirelessly communicate with a conversation partner; a display unit configured to display a conversation window displaying messages transceived with the conversation partner; and a controller configured to respond to a selection of a message among the displayed messages, display a virtual assistant in the conversation window and control the virtual assistance to output information related to the selected message, and in response to a user request, control the virtual assistant to output information related to the user request.

16 Claims, 25 Drawing Sheets

(56) References Cited

U.S. PATENT DOCUMENTS

| | | | |
|---|---|---|---|
| 2014/0164532 A1* | 6/2014 | Lynch | H04L 12/1818 709/206 |
| 2014/0173460 A1 | 6/2014 | Kim | |
| 2014/0179281 A1* | 6/2014 | Kim | G06F 3/167 455/414.1 |
| 2014/0317502 A1* | 10/2014 | Brown | G06F 9/453 715/706 |

* cited by examiner

MOBILE TERMINAL AND METHOD OF CONTROLLING THEREFOR

This application claims the benefit of the Korean Patent Application No. 10-2014-0186099, filed on Dec. 22, 2014, which is hereby incorporated by reference as if fully set forth herein.

BACKGROUND OF THE INVENTION

Field of the Invention

The present invention relates to a mobile terminal capable of outputting information for a user in the middle of conversation and a method of controlling therefor.

Discussion of the Related Art

Terminals may be generally classified as mobile/portable terminals or stationary terminals. Mobile terminals may also be classified as handheld terminals or vehicle mounted terminals. A function of a mobile terminal is diversifying. For instance, the function of the mobile terminal may include data and audio communication, picture and video capturing via a camera, voice recording, playing a music file via a speaker system and outputting an image or a video on a display unit. Some terminals perform a function of an electronic game or a function of a multimedia player. In particular, a latest mobile terminal can receive a multicast signal providing visual contents such as a broadcast, a video and a television program.

As a function of a terminal is diversified, the terminal is implemented in a multimedia player form equipped with complex functions including capturing a picture or a video, playing music or a video file, gaming, receiving a broadcast and the like for example. In addition, a user can perform communication with a different person whenever and wherever the user wants. In particular, the user can send a message to a different person via a text message, an instant message, e-mail, or the like and can check whether or not the different person reads the message. Moreover, the user can receive a reply from the different person in response to the message.

Yet, in order to send a message, since it is necessary to execute a specific application to write down the message, it is inconvenient to check information via a different application in the middle of writing down the message. As an example, when a user intends to check schedule information necessary for writing down a message in the middle of executing a message application, the user should execute a schedule application to check the schedule information after the message application is terminated (ended). If the schedule check is completed, the user should execute the message application again after the schedule application is terminated (ended).

SUMMARY OF THE INVENTION

Accordingly, the present invention is directed to an apparatus and method thereof that substantially obviate one or more problems due to limitations and disadvantages of the related art.

An object of the present invention is to provide a mobile terminal enhancing user convenience and a method of controlling therefor.

Specifically, an object of the present invention is to provide a mobile terminal capable of providing information necessary for a user during the conversation and a method of controlling therefor.

Another object of the present invention is to provide a mobile terminal capable of providing information necessary for a user via a virtual person not participating in the conversation and a method of controlling therefor.

Technical tasks obtainable from the present invention are non-limited the above mentioned technical tasks. And, other unmentioned technical tasks can be clearly understood from the following description by those having ordinary skill in the technical field to which the present invention pertains.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, according to one embodiment, a mobile terminal can include a wireless communication unit configured to perform a wireless communication with a conversation partner, a display unit configured to display a conversation window for outputting messages transceived with the conversation partner and a controller configured to control information requested by a user or information related to the messages to be output through the conversation window via a virtual person while the conversation window is output.

To further achieve these objects and other advantages and in accordance with the purpose of the invention, as embodied and broadly described herein, according to a different embodiment, a method of controlling a mobile terminal includes the steps of outputting a conversation window, outputting messages transceived with a conversation partner via the conversation window and outputting information requested by a user or information related to the messages via a virtual person.

Technical solutions obtainable from the present invention are non-limited the above mentioned technical solutions. And, other unmentioned technical solutions can be clearly understood from the following description by those having ordinary skill in the technical field to which the present invention pertains.

Effects obtainable from the present invention may be non-limited by the above mentioned effect. And, other unmentioned effects can be clearly understood from the following description by those having ordinary skill in the technical field to which the present invention pertains. It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE INVENTION

Description will now be given in detail according to exemplary embodiments disclosed herein, with reference to the accompanying drawings. For the sake of brief description with reference to the drawings, the same or equivalent components may be provided with the same reference numbers, and description thereof will not be repeated. In general, a suffix such as "module" and "unit" may be used to refer to elements or components. Use of such a suffix herein is merely intended to facilitate description of the specification, and the suffix itself is not intended to give any special meaning or function. In the present disclosure, that which is well-known to one of ordinary skill in the relevant art has generally been omitted for the sake of brevity. The accompanying drawings are used to help easily understand various technical features and it should be understood that the embodiments presented herein are not limited by the accompanying drawings. As such, the present disclosure should be construed to extend to any alterations, equivalents and substitutes in addition to those which are particularly set out in the accompanying drawings.

Although the terms first, second, etc. may be used herein to describe various elements, these elements should not be limited by these terms. These terms are generally only used to distinguish one element from another. When an element is referred to as being "connected with" another element, the element can be connected with the other element or intervening elements may also be present. In contrast, when an element is referred to as being "directly connected with" another element, there are no intervening elements present.

A singular representation may include a plural representation unless it represents a definitely different meaning from the context. Terms such as "include" or "has" are used herein and should be understood that they are intended to indicate an existence of several components, functions or steps, disclosed in the specification, and it is also understood that greater or fewer components, functions, or steps may likewise be utilized.

Mobile terminals presented herein may be implemented using a variety of different types of terminals. Examples of such terminals include cellular phones, smart phones, user equipment, laptop computers, digital broadcast terminals, personal digital assistants (PDAs), portable multimedia players (PMPs), navigators, portable computers (PCs), slate PCs, tablet PCs, ultra books, wearable devices (for example, smart watches, smart glasses, head mounted displays (HMDs)), and the like.

By way of non-limiting example only, further description will be made with reference to particular types of mobile terminals. However, such teachings apply equally to other types of terminals, such as those types noted above. In addition, these teachings may also be applied to stationary terminals such as digital TV, desktop computers, and the like.

Figure 1A:
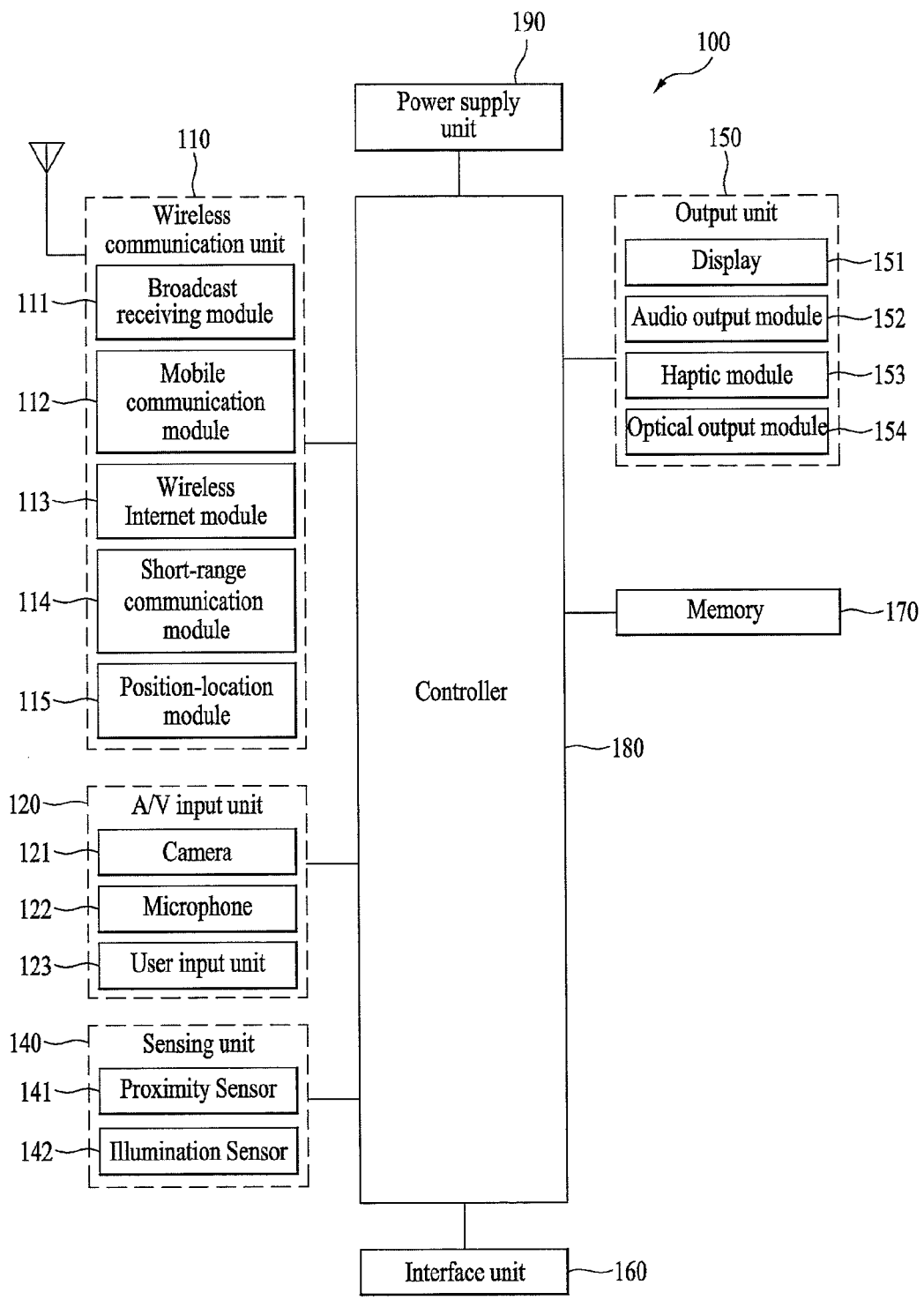
FIG. 1A is a block diagram illustrating explaining a mobile terminal related to the present invention.
Figure 1B:
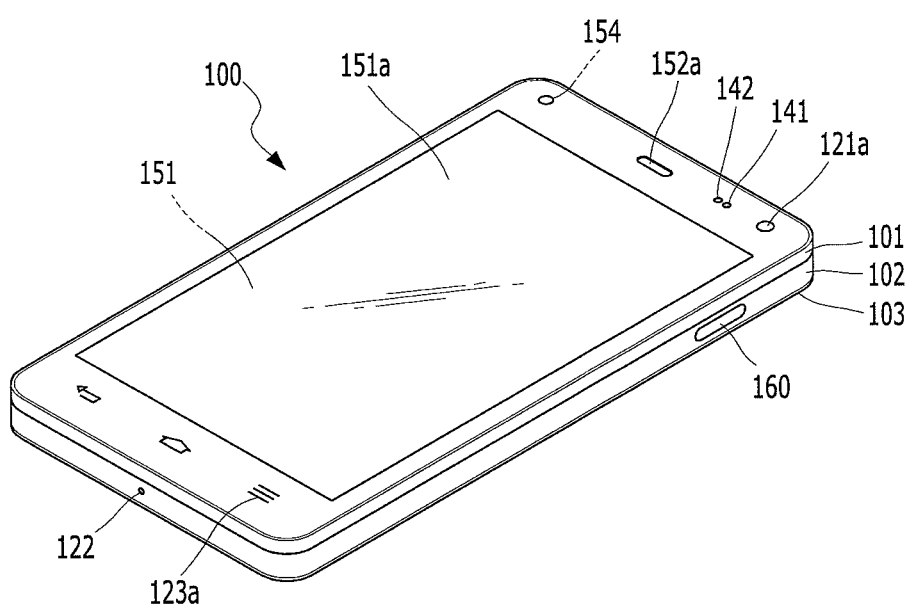
FIGS. 1B and 1C are conceptual views of one example of the mobile terminal, viewed from different directions.
Figure 1C:
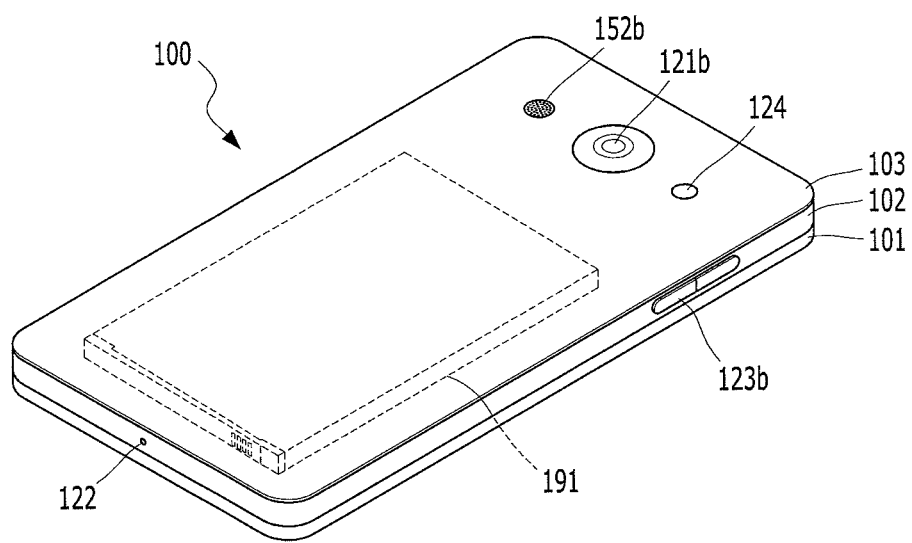

Reference is now made to FIGS. 1A-1C, where FIG. 1A is a block diagram of a mobile terminal in accordance with the present disclosure, and FIGS. 1B and 1C are conceptual views of one example of the mobile terminal, viewed from different directions.

The mobile terminal 100 is shown having components such as a wireless communication unit 110, an input unit 120, a sensing unit 140, an output unit 150, an interface unit 160, a memory 170, a controller 180, and a power supply unit 190. Implementing all of the illustrated components is not a requirement, and that greater or fewer components may alternatively be implemented. Referring now to FIG. 1A, the mobile terminal 100 is shown having wireless communication unit 110 configured with several commonly implemented components.

The wireless communication unit 110 typically includes one or more modules which permit communications such as wireless communications between the mobile terminal 100 and a wireless communication system, communications between the mobile terminal 100 and another mobile terminal, communications between the mobile terminal 100 and an external server. Further, the wireless communication unit 110 typically includes one or more modules which connect the mobile terminal 100 to one or more networks.

To facilitate such communications, the wireless communication unit 110 includes one or more of a broadcast receiving module 111, a mobile communication module 112, a wireless Internet module 113, a short-range communication module 114, and a location information module 115.

The input unit 120 includes a camera 121 for obtaining images or video, a microphone 122, which is one type of audio input device for inputting an audio signal, and a user input unit 123 (for example, a touch key, a push key, a mechanical key, a soft key, and the like) for allowing a user to input information. Data (for example, audio, video, image, and the like) is obtained by the input unit 120 and may be analyzed and processed by controller 180 according to device parameters, user commands, and combinations thereof.

The sensing unit 140 is typically implemented using one or more sensors configured to sense internal information of the mobile terminal, the surrounding environment of the mobile terminal, user information, and the like. For example, in FIG. 1A, the sensing unit 140 is shown having a proximity sensor 141 and an illumination sensor 142. If desired, the sensing unit 140 may alternatively or additionally include other types of sensors or devices, such as a touch sensor, an acceleration sensor, a magnetic sensor, a G-sensor, a gyroscope sensor, a motion sensor, an RGB sensor, an infrared (IR) sensor, a finger scan sensor, a ultrasonic sensor, an optical sensor (for example, camera 121), a microphone 122, a battery gauge, an environment sensor (for example, a barometer, a hygrometer, a thermometer, a radiation detection sensor, a thermal sensor, and a gas sensor, among others), and a chemical sensor (for example, an electronic nose, a health care sensor, a biometric sensor, and the like), to name a few. The mobile terminal 100 may be configured to utilize information obtained from sensing unit 140, and in particular, information obtained from one or more sensors of the sensing unit 140, and combinations thereof.

The output unit 150 is typically configured to output various types of information, such as audio, video, tactile output, and the like. The output unit 150 is shown having a display unit 151, an audio output module 152, a haptic module 153, and an optical output module 154. The display unit 151 may have an inter-layered structure or an integrated structure with a touch sensor in order to facilitate a touch screen. The touch screen may provide an output interface between the mobile terminal 100 and a user, as well as function as the user input unit 123 which provides an input interface between the mobile terminal 100 and the user.

The interface unit 160 serves as an interface with various types of external devices that can be coupled to the mobile terminal 100. The interface unit 160, for example, may include any of wired or wireless ports, external power supply ports, wired or wireless data ports, memory card ports, ports for connecting a device having an identification module, audio input/output (I/O) ports, video I/O ports, earphone ports, and the like. In some cases, the mobile terminal 100 may perform assorted control functions associated with a connected external device, in response to the external device being connected to the interface unit 160.

The memory 170 is typically implemented to store data to support various functions or features of the mobile terminal 100. For instance, the memory 170 may be configured to store application programs executed in the mobile terminal 100, data or instructions for operations of the mobile terminal 100, and the like. Some of these application programs may be downloaded from an external server via wireless communication. Other application programs may be installed within the mobile terminal 100 at time of manufacturing or shipping, which is typically the case for basic functions of the mobile terminal 100 (for example, receiving a call, placing a call, receiving a message, sending a message, and the like). It is common for application programs to be stored in the memory 170, installed in the mobile terminal 100, and executed by the controller 180 to perform an operation (or function) for the mobile terminal 100.

The controller 180 typically functions to control overall operation of the mobile terminal 100, in addition to the operations associated with the application programs. The controller 180 processes signals, data, information and the like input or output through the above-mentioned components and/or runs application programs saved in the memory 170, thereby processing or providing a user with appropriate information and/or functions.

The controller 180 can provide or process information or functions appropriate for a user by processing signals, data, information and the like, which are input or output by the various components depicted in FIG. 1A, or activating application programs stored in the memory 170. As one example, the controller 180 controls some or all of the components illustrated in FIG. 1A according to the execution of an application program that have been stored in the memory 170.

The power supply unit 190 can be configured to receive external power or provide internal power in order to supply appropriate power required for operating elements and components included in the mobile terminal 100. The power supply unit 190 may include a battery, and the battery may be configured to be embedded in the terminal body, or configured to be detachable from the terminal body.

At least one portion of the respective components mentioned in the foregoing description can cooperatively operate to embody operations, controls or controlling methods of the mobile terminal according to various embodiments of the present invention mentioned in the following description. Moreover, the operations, controls or controlling methods of the mobile terminal can be embodied in the mobile terminal by running at least one or more application programs saved in the memory 170.

Referring still to FIG. 1A, various components depicted in this figure will now be described in more detail. Regarding the wireless communication unit 110, the broadcast receiving module 111 is typically configured to receive a broadcast signal and/or broadcast associated information from an external broadcast managing entity via a broadcast channel. The broadcast channel may include a satellite channel, a terrestrial channel, or both. In some embodiments, two or more broadcast receiving modules 111 may be utilized to facilitate simultaneously receiving of two or more broadcast channels, or to support switching among broadcast channels.

The mobile communication module 112 can transmit and/or receive wireless signals to and from one or more network entities. Typical examples of a network entity include a base station, an external mobile terminal, a server, and the like. Such network entities form part of a mobile communication network, which is constructed according to technical standards or communication methods for mobile communications (for example, Global System for Mobile Communication (GSM), Code Division Multi Access (CDMA), CDMA2000 (Code Division Multi Access 2000), EV-DO (Enhanced Voice-Data Optimized or Enhanced Voice-Data Only), Wideband CDMA (WCDMA), High Speed Downlink Packet access (HSDPA), HSUPA (High Speed Uplink Packet Access), Long Term Evolution (LTE), LTE-A (Long Term Evolution-Advanced), and the like). Examples of wireless signals transmitted and/or received via the mobile communication module 112 include audio call signals, video (telephony) call signals, or various formats of data to support communication of text and multimedia messages.

The wireless Internet module 113 is configured to facilitate wireless Internet access. This module may be internally or externally coupled to the mobile terminal 100. The wireless Internet module 113 may transmit and/or receive wireless signals via communication networks according to wireless Internet technologies. Examples of such wireless Internet access include Wireless LAN (WLAN), Wireless Fidelity (Wi-Fi), Wi-Fi Direct, Digital Living Network Alliance (DLNA), Wireless Broadband (WiBro), Worldwide Interoperability for Microwave Access (WiMAX), High Speed Downlink Packet Access (HSDPA), HSUPA (High Speed Uplink Packet Access), Long Term Evolution (LTE), LTE-A (Long Term Evolution-Advanced), and the like. The wireless Internet module 113 may transmit/receive data according to one or more of such wireless Internet technologies, and other Internet technologies as well.

In some embodiments, when the wireless Internet access is implemented according to, for example, WiBro, HSDPA, HSUPA, GSM, CDMA, WCDMA, LTE, LTE-A and the like, as part of a mobile communication network, the wireless Internet module 113 performs such wireless Internet access. As such, the Internet module 113 may cooperate with, or function as, the mobile communication module 112.

The short-range communication module 114 is configured to facilitate short-range communications. Suitable technologies for implementing such short-range communications include BLUETOOTH™, Radio Frequency IDentification (RFID), Infrared Data Association (IrDA), Ultra-WideBand (UWB), ZigBee, Near Field Communication (NFC), Wireless-Fidelity (Wi-Fi), Wi-Fi Direct, Wireless USB (Wireless Universal Serial Bus), and the like. The short-range communication module 114 in general supports wireless communications between the mobile terminal 100 and a wireless communication system, communications between the mobile terminal 100 and another mobile terminal 100, or communications between the mobile terminal and a network where another mobile terminal 100 (or an external server) is located, via wireless area networks. One example of the wireless area networks is a wireless personal area networks.

In some embodiments, another mobile terminal (which may be configured similarly to mobile terminal 100) may be a wearable device, for example, a smart watch, a smart glass or a head mounted display (HMD), which can exchange data with the mobile terminal 100 (or otherwise cooperate with the mobile terminal 100). The short-range communication module 114 may sense or recognize the wearable device, and permit communication between the wearable device and the mobile terminal 100. In addition, when the sensed wearable device is a device which is authenticated to communicate with the mobile terminal 100, the controller 180, for example, may cause transmission of data processed in the mobile terminal 100 to the wearable device via the short-range communication module 114. Hence, a user of the wearable device may use the data processed in the mobile terminal 100 on the wearable device. For example, when a call is received in the mobile terminal 100, the user may answer the call using the wearable device. Also, when a message is received in the mobile terminal 100, the user can check the received message using the wearable device.

The location information module 115 is generally configured to detect, calculate, derive or otherwise identify a position of the mobile terminal. As an example, the location information module 115 includes a Global Position System (GPS) module, a Wi-Fi module, or both. If desired, the location information module 115 may alternatively or additionally function with any of the other modules of the wireless communication unit 110 to obtain data related to the position of the mobile terminal. As one example, when the mobile terminal uses a GPS module, a position of the mobile terminal may be acquired using a signal sent from a GPS satellite. As another example, when the mobile terminal uses the Wi-Fi module, a position of the mobile terminal can be acquired based on information related to a wireless access point (AP) which transmits or receives a wireless signal to or from the Wi-Fi module.

The input unit 120 may be configured to penult various types of input to the mobile terminal 120. Examples of such input include audio, image, video, data, and user input. Image and video input is often obtained using one or more cameras 121. Such cameras 121 may process image frames of still pictures or video obtained by image sensors in a video or image capture mode. The processed image frames can be displayed on the display unit 151 or stored in memory 170. In some cases, the cameras 121 may be arranged in a matrix configuration to permit a plurality of images having various angles or focal points to be input to the mobile terminal 100. As another example, the cameras 121 may be located in a stereoscopic arrangement to acquire left and right images for implementing a stereoscopic image.

The microphone 122 is generally implemented to permit audio input to the mobile terminal 100. The audio input can be processed in various manners according to a function being executed in the mobile terminal 100. If desired, the microphone 122 may include assorted noise removing algorithms to remove unwanted noise generated in the course of receiving the external audio.

The user input unit 123 is a component that permits input by a user. Such user input may enable the controller 180 to control operation of the mobile terminal 100. The user input unit 123 may include one or more of a mechanical input element (for example, a key, a button located on a front and/or rear surface or a side surface of the mobile terminal 100, a dome switch, a jog wheel, a jog switch, and the like), or a touch-sensitive input, among others. As one example, the touch-sensitive input may be a virtual key or a soft key, which is displayed on a touch screen through software processing, or a touch key which is located on the mobile terminal at a location that is other than the touch screen. Further, the virtual key or the visual key may be displayed on the touch screen in various shapes, for example, graphic, text, icon, video, or a combination thereof.

The sensing unit 140 is generally configured to sense one or more of internal information of the mobile terminal, surrounding environment information of the mobile terminal, user information, or the like. The controller 180 generally cooperates with the sending unit 140 to control operation of the mobile terminal 100 or execute data processing, a function or an operation associated with an application program installed in the mobile terminal based on the sensing provided by the sensing unit 140. The sensing unit 140 may be implemented using any of a variety of sensors, some of which will now be described in more detail.

The proximity sensor 141 may include a sensor to sense presence or absence of an object approaching a surface, or an object located near a surface, by using an electromagnetic field, infrared rays, or the like without a mechanical contact. The proximity sensor 141 may be arranged at an inner region of the mobile terminal covered by the touch screen, or near the touch screen.

The proximity sensor 141, for example, may include any of a transmissive type photoelectric sensor, a direct reflective type photoelectric sensor, a mirror reflective type photoelectric sensor, a high-frequency oscillation proximity sensor, a capacitance type proximity sensor, a magnetic type proximity sensor, an infrared rays proximity sensor, and the like. When the touch screen is implemented as a capacitance type, the proximity sensor 141 can sense proximity of a pointer relative to the touch screen by changes of an electromagnetic field, which is responsive to an approach of an object with conductivity. In this instance, the touch screen (touch sensor) may also be categorized as a proximity sensor.

The term "proximity touch" will often be referred to herein to denote the scenario in which a pointer is positioned to be proximate to the touch screen without contacting the touch screen. The term "contact touch" will often be referred to herein to denote the scenario in which a pointer makes physical contact with the touch screen. For the position corresponding to the proximity touch of the pointer relative to the touch screen, such position will correspond to a position where the pointer is perpendicular to the touch screen. The proximity sensor 141 may sense proximity touch, and proximity touch patterns (for example, distance, direction, speed, time, position, moving status, and the like).

In general, controller 180 processes data corresponding to proximity touches and proximity touch patterns sensed by the proximity sensor 141, and cause output of visual information on the touch screen. In addition, the controller 180 can control the mobile terminal 100 to execute different operations or process different data according to whether a touch with respect to a point on the touch screen is either a proximity touch or a contact touch.

A touch sensor can sense a touch applied to the touch screen, such as display unit 151, using any of a variety of touch methods. Examples of such touch methods include a resistive type, a capacitive type, an infrared type, and a magnetic field type, among others. As one example, the touch sensor may be configured to convert changes of pressure applied to a specific part of the display unit 151, or convert capacitance occurring at a specific part of the display unit 151, into electric input signals. The touch sensor may also be configured to sense not only a touched position and a touched area, but also touch pressure and/or touch capacitance. A touch object is generally used to apply a touch input to the touch sensor. Examples of typical touch objects include a finger, a touch pen, a stylus pen, a pointer, or the like.

When a touch input is sensed by a touch sensor, corresponding signals may be transmitted to a touch controller. The touch controller may process the received signals, and then transmit corresponding data to the controller 180. Accordingly, the controller 180 can sense which region of the display unit 151 has been touched. Here, the touch controller may be a component separate from the controller 180, the controller 180, and combinations thereof.

In some embodiments, the controller 180 can execute the same or different controls according to a type of touch object that touches the touch screen or a touch key provided in addition to the touch screen. Whether to execute the same or different control according to the object which provides a touch input may be decided based on a current operating state of the mobile terminal 100 or a currently executed application program, for example.

The touch sensor and the proximity sensor may be implemented individually, or in combination, to sense various types of touches. Such touches includes a short (or tap) touch, a long touch, a multi-touch, a drag touch, a flick touch, a pinch-in touch, a pinch-out touch, a swipe touch, a hovering touch, and the like.

If desired, an ultrasonic sensor may be implemented to recognize position information relating to a touch object using ultrasonic waves. The controller 180, for example, may calculate a position of a wave generation source based on information sensed by an illumination sensor and a plurality of ultrasonic sensors. Since light is much faster than ultrasonic waves, the time for which the light reaches the optical sensor is much shorter than the time for which the ultrasonic wave reaches the ultrasonic sensor. The position of the wave generation source may be calculated using this fact. For instance, the position of the wave generation source may be calculated using the time difference from the time that the ultrasonic wave reaches the sensor based on the light as a reference signal.

The camera 121 typically includes at least one a camera sensor (CCD, CMOS etc.), a photo sensor (or image sensors), and a laser sensor. Implementing the camera 121 with a laser sensor may allow detection of a touch of a physical object with respect to a 3D stereoscopic image. The photo sensor may be laminated on, or overlapped with, the display device. The photo sensor may be configured to scan movement of the physical object in proximity to the touch screen. In more detail, the photo sensor may include photo diodes and transistors at rows and columns to scan content received at the photo sensor using an electrical signal which changes according to the quantity of applied light. Namely, the photo sensor may calculate the coordinates of the physical object according to variation of light to thus obtain position information of the physical object.

The display unit 151 is generally configured to output information processed in the mobile terminal 100. For example, the display unit 151 may display execution screen information of an application program executing at the mobile terminal 100 or user interface (UI) and graphic user interface (GUI) information in response to the execution screen information. In some embodiments, the display unit 151 may be implemented as a stereoscopic display unit for displaying stereoscopic images. A typical stereoscopic display unit may employ a stereoscopic display scheme such as a stereoscopic scheme (a glass scheme), an auto-stereoscopic scheme (glassless scheme), a projection scheme (holographic scheme), or the like.

The audio output module 152 is generally configured to output audio data. Such audio data may be obtained from any of a number of different sources, such that the audio data may be received from the wireless communication unit 110 or may have been stored in the memory 170. The audio data may be output during modes such as a signal reception mode, a call mode, a record mode, a voice recognition mode, a broadcast reception mode, and the like. The audio output module 152 can provide audible output related to a particular function (e.g., a call signal reception sound, a message reception sound, etc.) performed by the mobile terminal 100. The audio output module 152 may also be implemented as a receiver, a speaker, a buzzer, or the like.

A haptic module 153 can be configured to generate various tactile effects that a user feels, perceive, or otherwise experience. A typical example of a tactile effect generated by the haptic module 153 is vibration. The strength, pattern and the like of the vibration generated by the haptic module 153 can be controlled by user selection or setting by the controller. For example, the haptic module 153 may output different vibrations in a combining manner or a sequential manner.

Besides vibration, the haptic module 153 can generate various other tactile effects, including an effect by stimulation such as a pin arrangement vertically moving to contact skin, a spray force or suction force of air through a jet orifice or a suction opening, a touch to the skin, a contact of an electrode, electrostatic force, an effect by reproducing the sense of cold and warmth using an element that can absorb or generate heat, and the like.

The haptic module 153 can also be implemented to allow the user to feel a tactile effect through a muscle sensation such as the user's fingers or arm, as well as transferring the tactile effect through direct contact. Two or more haptic modules 153 may be provided according to the particular configuration of the mobile terminal 100.

An optical output module 154 can output a signal for indicating an event generation using light of a light source. Examples of events generated in the mobile terminal 100 may include message reception, call signal reception, a missed call, an alarm, a schedule notice, an email reception, information reception through an application, and the like. A signal output by the optical output module 154 may be implemented so the mobile terminal emits monochromatic light or light with a plurality of colors. The signal output may be terminated as the mobile terminal senses that a user has checked the generated event, for example.

The interface unit 160 serves as an interface for external devices to be connected with the mobile terminal 100. For example, the interface unit 160 can receive data transmitted from an external device, receive power to transfer to elements and components within the mobile terminal 100, or transmit internal data of the mobile terminal 100 to such external device. The interface unit 160 may include wired or wireless headset ports, external power supply ports, wired or wireless data ports, memory card ports, ports for connecting a device having an identification module, audio input/output (I/O) ports, video I/O ports, earphone ports, or the like.

The identification module may be a chip that stores various information for authenticating authority of using the mobile terminal 100 and may include a user identity module (UIM), a subscriber identity module (SIM), a universal subscriber identity module (USIM), and the like. In addition, the device having the identification module (also referred to herein as an "identifying device") may take the form of a smart card. Accordingly, the identifying device can be connected with the terminal 100 via the interface unit 160.

When the mobile terminal 100 is connected with an external cradle, the interface unit 160 can serve as a passage to allow power from the cradle to be supplied to the mobile terminal 100 or may serve as a passage to allow various command signals input by the user from the cradle to be transferred to the mobile terminal there through. Various command signals or power input from the cradle may operate as signals for recognizing that the mobile terminal is properly mounted on the cradle.

The memory 170 can store programs to support operations of the controller 180 and store input/output data (for example, phonebook, messages, still images, videos, etc.). The memory 170 may store data related to various patterns of vibrations and audio which are output in response to touch inputs on the touch screen.

The memory 170 may include one or more types of storage mediums including a Flash memory, a hard disk, a solid state disk, a silicon disk, a multimedia card micro type, a card-type memory (e.g., SD or DX memory, etc.), a Random Access Memory (RAM), a Static Random Access Memory (SRAM), a Read-Only Memory (ROM), an Electrically Erasable Programmable Read-Only Memory (EEPROM), a Programmable Read-Only memory (PROM), a magnetic memory, a magnetic disk, an optical disk, and the like. The mobile terminal 100 may also be operated in relation to a network storage device that performs the storage function of the memory 170 over a network, such as the Internet.

The controller 180 can typically control the general operations of the mobile terminal 100. For example, the controller 180 can set or release a lock state for restricting a user from inputting a control command with respect to applications when a status of the mobile terminal meets a preset condition.

The controller 180 can also perform the controlling and processing associated with voice calls, data communications, video calls, and the like, or perform pattern recognition processing to recognize a handwriting input or a picture drawing input performed on the touch screen as characters or images, respectively. In addition, the controller 180 can control one or a combination of those components in order to implement various exemplary embodiments disclosed herein.

The power supply unit 190 receives external power or provide internal power and supply the appropriate power required for operating respective elements and components included in the mobile terminal 100. The power supply unit 190 may include a battery, which is typically rechargeable or be detachably coupled to the terminal body for charging.

The power supply unit 190 may include a connection port. The connection port may be configured as one example of the interface unit 160 to which an external charger for supplying power to recharge the battery is electrically connected. As another example, the power supply unit 190 may be configured to recharge the battery in a wireless manner without use of the connection port. In this example, the power supply unit 190 can receive power, transferred from an external wireless power transmitter, using at least one of an inductive coupling method which is based on magnetic induction or a magnetic resonance coupling method which is based on electromagnetic resonance. Various embodiments described herein may be implemented in a computer-readable medium, a machine-readable medium, or similar medium using, for example, software, hardware, or any combination thereof.

Referring now to FIGS. 1B and 1C, the mobile terminal 100 is described with reference to a bar-type terminal body. However, the mobile terminal 100 may alternatively be implemented in any of a variety of different configurations. Examples of such configurations include watch-type, clip-type, glasses-type, or as a folder-type, flip-type, slide-type, swing-type, and swivel-type in which two and more bodies are combined with each other in a relatively movable manner, and combinations thereof. Discussion herein will often relate to a particular type of mobile terminal (for example, bar-type, watch-type, glasses-type, and the like). However, such teachings with regard to a particular type of mobile terminal will generally apply to other types of mobile terminals as well.

The mobile terminal 100 will generally include a case (for example, frame, housing, cover, and the like) forming the appearance of the terminal. In this embodiment, the case is formed using a front case 101 and a rear case 102. Various electronic components are incorporated into a space formed between the front case 101 and the rear case 102. At least one middle case may be additionally positioned between the front case 101 and the rear case 102.

The display unit 151 is shown located on the front side of the terminal body to output information. As illustrated, a window 151a of the display unit 151 may be mounted to the front case 101 to form the front surface of the terminal body together with the front case 101. In some embodiments, electronic components may also be mounted to the rear case 102. Examples of such electronic components include a detachable battery 191, an identification module, a memory card, and the like. Rear cover 103 is shown covering the electronic components, and this cover may be detachably coupled to the rear case 102. Therefore, when the rear cover 103 is detached from the rear case 102, the electronic components mounted to the rear case 102 are externally exposed.

As illustrated, when the rear cover 103 is coupled to the rear case 102, a side surface of the rear case 102 is partially exposed. In some cases, upon the coupling, the rear case 102 may also be completely shielded by the rear cover 103. In some embodiments, the rear cover 103 may include an opening for externally exposing a camera 121b or an audio output module 152b.

The cases 101, 102, 103 may be formed by injection-molding synthetic resin or may be formed of a metal, for example, stainless steel (STS), aluminum (Al), titanium (Ti), or the like. As an alternative to the example in which the plurality of cases form an inner space for accommodating components, the mobile terminal 100 may be configured such that one case forms the inner space. In this example, a mobile terminal 100 having a uni-body is formed so synthetic resin or metal extends from a side surface to a rear surface.

If desired, the mobile terminal 100 may include a waterproofing unit for preventing introduction of water into the terminal body. For example, the waterproofing unit may include a waterproofing member which is located between the window 151a and the front case 101, between the front case 101 and the rear case 102, or between the rear case 102 and the rear cover 103, to hermetically seal an inner space when those cases are coupled.

The mobile terminal 100 may be provided with the display unit 151, the first audio output unit 152a, the second audio output unit 152b, the proximity sensor 141, the illumination sensor 142, the light output unit 154, the first camera 121a, the second camera 121b, the first manipulating unit 123a, the second manipulating unit 123b, the microphone 122, the interface unit 160, and the like.

FIGS. 1B and 1C depict certain components as arranged on the mobile terminal. However, alternative arrangements are possible and within the teachings of the instant disclosure. Some components may be omitted or rearranged. For example, the first manipulation unit 123a may be located on another surface of the terminal body, and the second audio output module 152b may be located on the side surface of the terminal body.

The display unit 151 outputs information processed in the mobile terminal 100. The display unit 151 may be implemented using one or more suitable display devices. Examples of such suitable display devices include a liquid crystal display (LCD), a thin film transistor-liquid crystal display (TFT-LCD), an organic light emitting diode (OLED), a flexible display, a 3-dimensional (3D) display, an e-ink display, and combinations thereof.

The display unit 151 may be implemented using two display devices, which can implement the same or different display technology. For instance, a plurality of the display units 151 may be arranged on one side, either spaced apart from each other, or these devices may be integrated, or these devices may be arranged on different surfaces.

The display unit 151 may also include a touch sensor which senses a touch input received at the display unit. When a touch is input to the display unit 151, the touch sensor may be configured to sense this touch and the controller 180, for example, may generate a control command or other signal corresponding to the touch. The content which is input in the touching manner may be text or a numerical value, or a menu item which can be indicated or designated in various modes.

The touch sensor may be configured in a form of a film having a touch pattern, disposed between the window 151a and a display on a rear surface of the window 151a, or a metal wire which is patterned directly on the rear surface of the window 151a. Alternatively, the touch sensor may be integrally formed with the display. For example, the touch sensor may be disposed on a substrate of the display or within the display. The display unit 151 may also form a touch screen together with the touch sensor. Here, the touch screen may serve as the user input unit 123 (see FIG. 1A). Therefore, the touch screen may replace at least some of the functions of the first manipulation unit 123a.

The first audio output module 152a may be implemented in the form of a speaker to output voice audio, alarm sounds, multimedia audio reproduction, and the like. The window 151a of the display unit 151 will typically include an aperture to permit audio generated by the first audio output module 152a to pass. One alternative is to allow audio to be released along an assembly gap between the structural bodies (for example, a gap between the window 151a and the front case 101). In this instance, a hole independently formed to output audio sounds may not be seen or is otherwise hidden in terms of appearance, thereby further simplifying the appearance and manufacturing of the mobile terminal 100.

The optical output module 154 can be configured to output light for indicating an event generation. Examples of such events include a message reception, a call signal reception, a missed call, an alarm, a schedule notice, an email reception, information reception through an application, and the like. When a user has checked a generated event, the controller can control the optical output unit 154 to stop the light output.

The first camera 121a can process image frames such as still or moving images obtained by the image sensor in a capture mode or a video call mode. The processed image frames can then be displayed on the display unit 151 or stored in the memory 170.

The first and second manipulation units 123a and 123b are examples of the user input unit 123, which may be manipulated by a user to provide input to the mobile terminal 100. The first and second manipulation units 123a and 123b may also be commonly referred to as a manipulating portion, and may employ any tactile method that allows the user to perform manipulation such as touch, push, scroll, or the like. The first and second manipulation units 123a and 123b may also employ any non-tactile method that allows the user to perform manipulation such as proximity touch, hovering, or the like.

FIG. 1B illustrates the first manipulation unit 123a as a touch key, but possible alternatives include a mechanical key, a push key, a touch key, and combinations thereof. Input received at the first and second manipulation units 123a and 123b may be used in various ways. For example, the first manipulation unit 123a may be used by the user to provide an input to a menu, home key, cancel, search, or the like, and the second manipulation unit 123b may be used by the user to provide an input to control a volume level being output from the first or second audio output modules 152a or 152b, to switch to a touch recognition mode of the display unit 151, or the like.

As another example of the user input unit 123, a rear input unit may be located on the rear surface of the terminal body. The rear input unit can be manipulated by a user to provide input to the mobile terminal 100. The input may be used in a variety of different ways. For example, the rear input unit may be used by the user to provide an input for power on/off, start, end, scroll, control volume level being output from the first or second audio output modules 152a or 152b, switch to a touch recognition mode of the display unit 151, and the like. The rear input unit may be configured to permit touch input, a push input, or combinations thereof.

The rear input unit may be located to overlap the display unit 151 of the front side in a thickness direction of the terminal body. As one example, the rear input unit may be located on an upper end portion of the rear side of the terminal body such that a user can easily manipulate it using a forefinger when the user grabs the terminal body with one hand. Alternatively, the rear input unit can be positioned at most any location of the rear side of the terminal body.

Embodiments that include the rear input unit may implement some or all of the functionality of the first manipulation unit 123a in the rear input unit. As such, in situations where the first manipulation unit 123a is omitted from the front side, the display unit 151 can have a larger screen. As a further alternative, the mobile terminal 100 may include a finger scan sensor which scans a user's fingerprint. The controller 180 can then use fingerprint information sensed by the finger scan sensor as part of an authentication procedure. The finger scan sensor may also be installed in the display unit 151 or implemented in the user input unit 123.

The microphone 122 is shown located at an end of the mobile terminal 100, but other locations are possible. If desired, multiple microphones may be implemented, with such an arrangement permitting the receiving of stereo sounds.

The interface unit 160 may serve as a path allowing the mobile terminal 100 to interface with external devices. For example, the interface unit 160 may include one or more of a connection terminal for connecting to another device (for example, an earphone, an external speaker, or the like), a port for near field communication (for example, an Infrared Data Association (IrDA) port, a Bluetooth port, a wireless LAN port, and the like), or a power supply terminal for supplying power to the mobile terminal 100. The interface unit 160 may be implemented in the form of a socket for accommodating an external card, such as Subscriber Identification Module (SIM), User Identity Module (UIM), or a memory card for information storage.

The second camera 121b is shown located at the rear side of the terminal body and includes an image capturing direction that is substantially opposite to the image capturing direction of the first camera unit 121a. If desired, second camera 121a may alternatively be located at other locations, or made to be moveable, in order to have a different image capturing direction from that which is shown.

The second camera 121b can include a plurality of lenses arranged along at least one line. The plurality of lenses may also be arranged in a matrix configuration. The cameras may be referred to as an "array camera." When the second camera 121b is implemented as an array camera, images may be captured in various manners using the plurality of lenses and images with better qualities.

As shown in FIG. 1C, a flash 124 is shown adjacent to the second camera 121b. When an image of a subject is captured with the camera 121b, the flash 124 may illuminate the subject. As shown in FIG. 1C, the second audio output module 152b can be located on the terminal body. The second audio output module 152b may implement stereophonic sound functions in conjunction with the first audio output module 152a, and may be also used for implementing a speaker phone mode for call communication.

At least one antenna for wireless communication may be located on the terminal body. The antenna may be installed in the terminal body or formed by the case. For example, an antenna which configures a part of the broadcast receiving module 111 may be retractable into the terminal body. Alternatively, an antenna may be formed using a film attached to an inner surface of the rear cover 103, or a case that includes a conductive material.

A power supply unit 190 for supplying power to the mobile terminal 100 may include a battery 191, which is mounted in the terminal body or detachably coupled to an outside of the terminal body. The battery 191 may receive power via a power source cable connected to the interface unit 160. Also, the battery 191 can be recharged in a wireless manner using a wireless charger. Wireless charging may be implemented by magnetic induction or electromagnetic resonance.

The rear cover 103 is shown coupled to the rear case 102 for shielding the battery 191, to prevent separation of the battery 191, and to protect the battery 191 from an external impact or from foreign material. When the battery 191 is detachable from the terminal body, the rear case 103 may be detachably coupled to the rear case 102.

An accessory for protecting an appearance or assisting or extending the functions of the mobile terminal 100 can also be provided on the mobile terminal 100. As one example of an accessory, a cover or pouch for covering or accommodating at least one surface of the mobile terminal 100 may be provided. The cover or pouch may cooperate with the display unit 151 to extend the function of the mobile terminal 100. Another example of the accessory is a touch pen for assisting or extending a touch input to a touch screen.

For clarity of explanation, assume that the mobile terminal according to an embodiment of the present invention includes at least one selected from the group including configuration elements shown in FIG. 1A to FIG. 1C. Specifically, assume that the mobile terminal according to an embodiment of the present invention includes a wireless communication unit 110, a microphone 122, a display unit 151, a memory 170 and a controller 180.

In an embodiment described in the following, assume that the display unit 151 corresponds to a touch screen. Hence, the display unit 151 can function not only as an output device outputting information but also as an input device receiving a touch input. Yet, a touch input can be replaced with a push input pushing a button, a gesture input moving a mobile terminal or the like.

Further, a person using the mobile terminal according to the present invention is called a user in embodiments described in the following. Moreover, a different terminal (or a person using the different terminal) performing communication with the mobile terminal according to an embodiment of the present invention is called a conversation partner. If three or more participants are participating in conversation, the rest of persons except the user can be called the conversation partner.

Embodiments of the present invention relate to a method of making an assistant (or agent) appear to assist a user in the middle of conducting a conversation with a conversation partner. The assistant described corresponds to a virtual user participating in a conversation and assists a conversation of a user. Information output by the assistant is exposed to the user only and may be not exposed to a conversation partner. In particular, the controller 180 can output information via the assistant and can control the output information not to be transmitted to a conversation partner.

The controller 180 can control the assistant for assisting a user to be appeared in response to an input of a user operating the mobile terminal or through conversation contents analysis. Users can conduct a conversation by sending and receiving a message with each other. In particular, in the present invention, a state of conducting a conversation between users may correspond to a state of writing a message to send the message to a different user by a user, a state of transmitting a message to a different user by a user, a state of receiving a message from a different user by a user and the like. A message described in the present invention includes not only a text message (SMS, LMS, MMS, etc.), an instant message but also E-mail, SNS (Social Network Service) and the like.

That is, sending and receiving (transceiving) a text message, an instant message or e-mail between users can be regarded as a conversation between users and writing a post on an SNS account of a specific user can also be regarded as a conversation between users. While a conversation is performed between users, a conversation window (or a chatting window) can be output via a mobile terminal. The conversation window is used for displaying conversation contents between users and writing a message to be transmitted.

Figure 2:
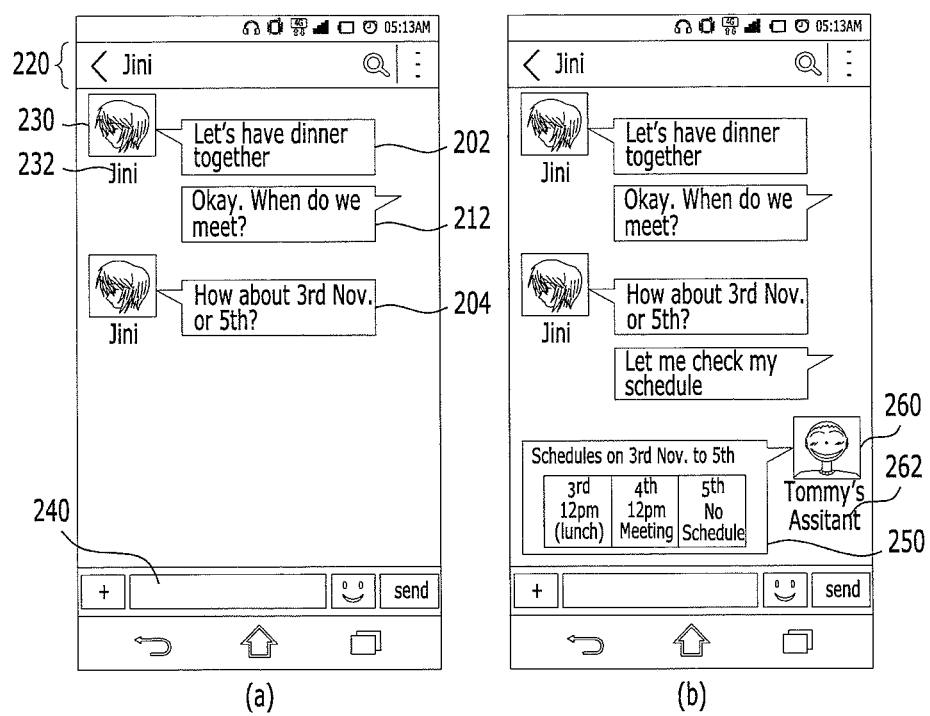
FIG. 2 is a diagram illustrating an example of a conversation window.

FIG. 2 shows an example of the conversation window. Referring to FIG. 2, a conversation window can include a text input box for displaying conversation contents between users and message written contents. In this instance, a message transmitted by a user to a conversation partner and a message received by the user from the conversation partner can be displayed by being visually distinguished from each other.

Referring to FIG. 2(a), messages 202/204 received from a conversation partner are displayed by being stuck to the left of the conversation window and a message 212 transmitted by a user is displayed by being stuck to the right of the conversation window. Identification information of a conversation partner can be displayed on the conversation window.

Referring to FIG. 2(a), a name of a conversation partner is displayed on a title displaying line 220 of the conversation window and a profile picture 230 and the name 232 of the conversation partner are displayed on each of messages received from the conversation partner.

Further, text input box 240 is used for displaying contents of a message written by a user. If the text input box is touched, the controller 180 can output a virtual keypad for inputting text. The controller 180 can display text, which is input according to the touch of the virtual keypad, on the text input box. When outputting information via an assistant, identification information can be output in the vicinity of the output information 250 to indicate that the information is output by the assistant.

In this instance, the identification information of the assistant can include an image indicating the assistant, a name indicating the assistant and the like. FIG. 2(b) shows an example that an image 260 indicating the assistant and a name 262 of the assistant are output at the same time in the vicinity of the output information.

Figure 3:
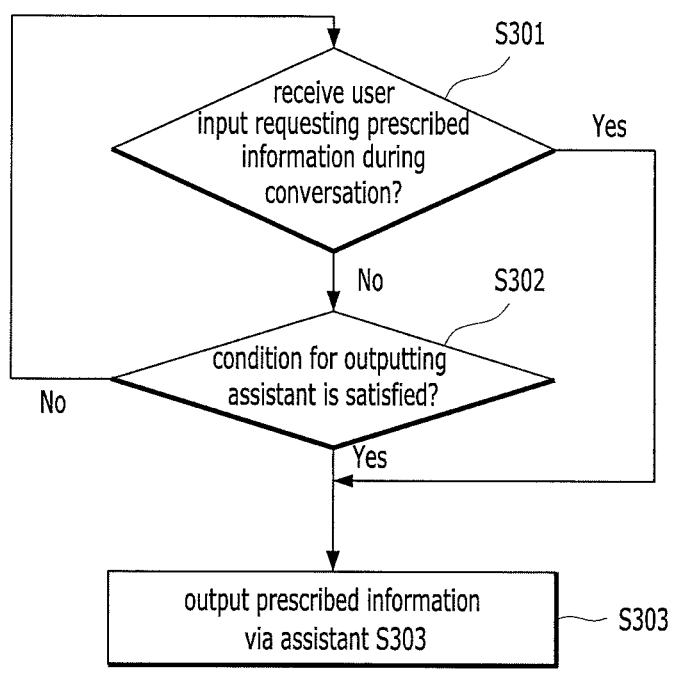
FIG. 3 is a flowchart illustrating an operation of a mobile terminal according to one embodiment of the present invention.

Next, FIG. 3 is a flowchart illustrating an operation of a mobile terminal according to one embodiment of the present invention. For clarity, assume that a conversation window for displaying conversation contents of two or more users is output via the display unit 151. As shown, if a user input for requesting information related to a message displayed on the conversation window or information requested by a user is received (Yes in S301), the controller 180 outputs the information related to the message or the information requested by the user via an assistant (S303). In this instance, the information output via the assistant is exposed to the user only and the information is not exposed to a conversation partner.

If a user input is not received (No in S301), and if a prescribed condition occurs (S302), the controller 180 provides the user with prescribed information via the assistant (S303). In the following description, various embodiments for outputting information via the assistant are explained in detail with reference to the drawings.

In more detail, if a touch input for selecting a message from messages (i.e., messages received from a conversation partner) output on a conversation window or selecting a part of contents of the messages is received, the controller 180 can output a menu for processing the selected message or the selected part. If an item for calling an assistant is selected from the menu, the controller 180 can output a search result for the selected content via the assistant.

Figure 4:
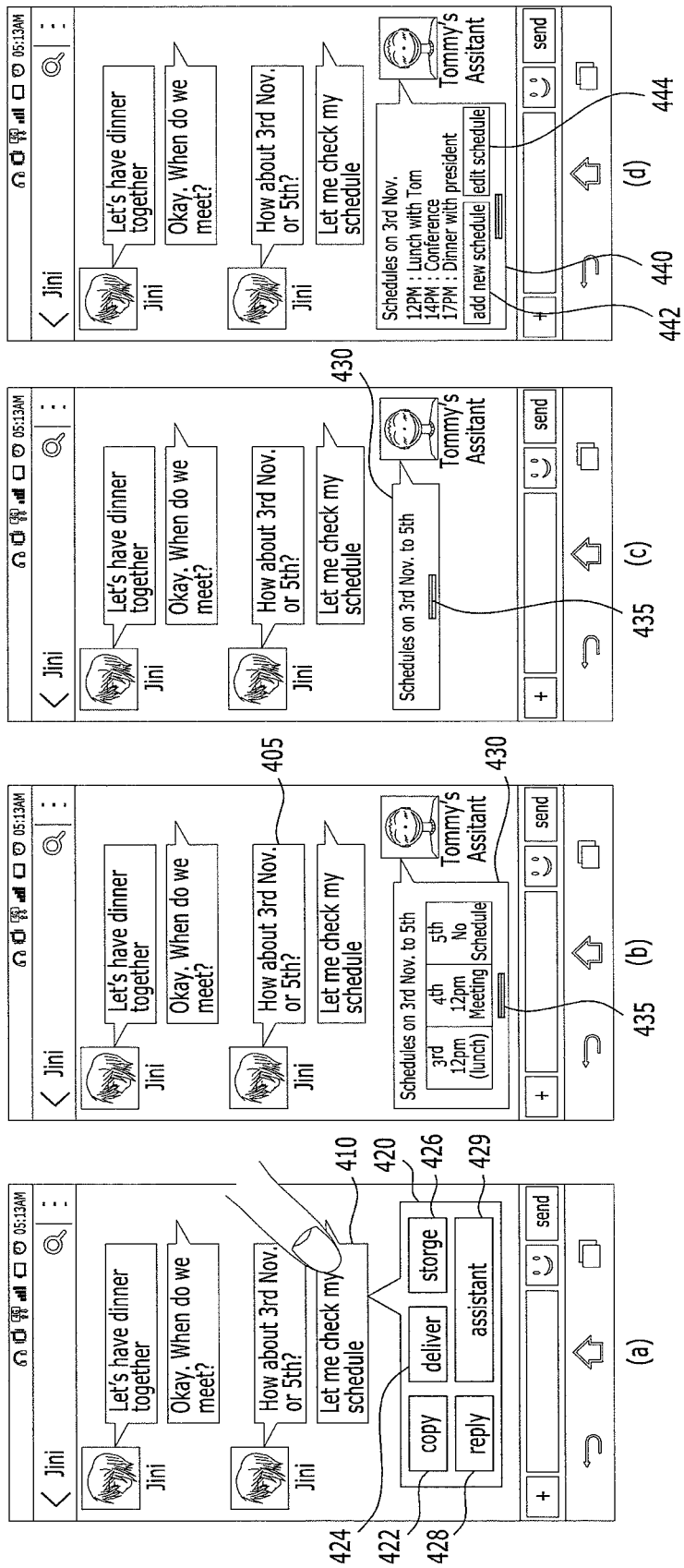
FIG. 4 is a diagram illustrating an example of an appearing assistant.

Next, FIG. 4 is a diagram illustrating an example of an appearing assistant. If a prescribed message is selected from a conversation window, as shown in FIG. 4(a), the controller 180 can display a menu 420 for processing the selected message 410. Referring to FIG. 4(a), the menu 420 can include an item 422 for copying the selected message, an item 424 for delivering the selected message to a different user, an item 428 for replying to the selected message and an item 429 for calling an assistant.

If the item 429 for calling the assistant is selected from the menu 420, the controller 180 analyzes a context of the selected message 410 and can then output information for a user based on the analyzed content. Referring to FIG. 4(a), if the content of the selected message 410 corresponds to content for requesting schedule check such as "Let me check my schedule", the controller 180 can output a search result for a schedule of a user via the assistant. If the selected message includes a specific date or a vocabulary (e.g., this Friday, next Monday, etc.) indicating the specific date, the controller 180 can output a schedule of the user corresponding to the specific date.

In addition, as shown in FIG. 4(a), if a vocabulary capable of analogizing a specific date is not included in the message, the controller 180 can consider previous conversation contents. Referring to FIG. 4(a), since a message 405 including such a vocabulary indicating a specific date as "$3^{rd}$ November or $5^{th}$" is received from a conversation partner before the message "Let me check my schedule" is transmitted to the conversation partner, the controller 180 can output schedules of the user regarding November 3 and 5.

For example, FIG. 4(b) shows an example of outputting schedules 430 from November 3 to 5. If an amount of information output via the assistant is a lot, a space for displaying conversation contents of conversation participants becomes small due to the amount of the information. Hence, the controller 180 can control the amount of the information to be outputted via the assistant.

Referring to FIG. 4(b), the controller 180 can control the total amount of the information to be outputted via the assistant. In addition, referring to FIG. 4(c), the controller can output a part of the information via the assistant. In this instance, the amount of the information to be output can be controlled by a user input. The controller 180 can output the amount of information via the assistant to be controlled based on a drag input on a handler 435 which is included in a conversation box 430 in which the information is output.

As a different example, if a text input box is touched in the middle of outputting information via the assistant, the controller 180 can control the amount of information output via the assistant to be reduced. Since touching the text input box is interpreted as a user intends to transmit a message to a conversation partner, the controller 180 can reduce the amount of information output via the assistant to enable a user to check previous conversation contents.

If a specific date is selected from schedule information output via the assistant, the controller 180 can output a schedule of the selected date in detail. Referring to FIG. 4(b), if November 3 is touched among the schedules, as shown in an example of FIG. 4(d), the controller 180 can output a detail schedule 440 of November 3. In this instance, the controller 180 can perform such an operation as adding a new schedule to November 3, deleting a pre-registered schedule, modifying a pre-registered schedule and the like based on a user input.

Referring to FIG. 4(d), a new schedule add item 442 may corresponds to an item for adding a new schedule to November 3 and a schedule edit item 444 may correspond to an item for editing or deleting a schedule previously registered at November 3. Although schedule information is explained as an example in FIG. 4, contents capable of being provided by the assistant may be non-limited by the schedule information. If a vocabulary indicating a specific place is included in a message, the controller 180 can display a map indicating the place, a schedule of which the place is registered as an event occurrence place, a picture captured at the place and the like via the assistant.

In addition, if a vocabulary indicating a specific person is included in a message, the controller 180 can output contact information of the person, a picture of the person and the like via the assistant. If a name of a specific product is included in a message, the controller 180 can output information on the specific product via the assistant.

In this instance, the information on the product can include purchase information (e.g., price of the product, lowest price of the product and the like) of the product, description (e.g., advertisement on the product or manual of the product) on the product and the like. If a keyword, which is repeatedly used during a conversation, is included in a message selected by a user, the controller 180 can output a search result searched based on the keyword via the assistant.

Figure 5:
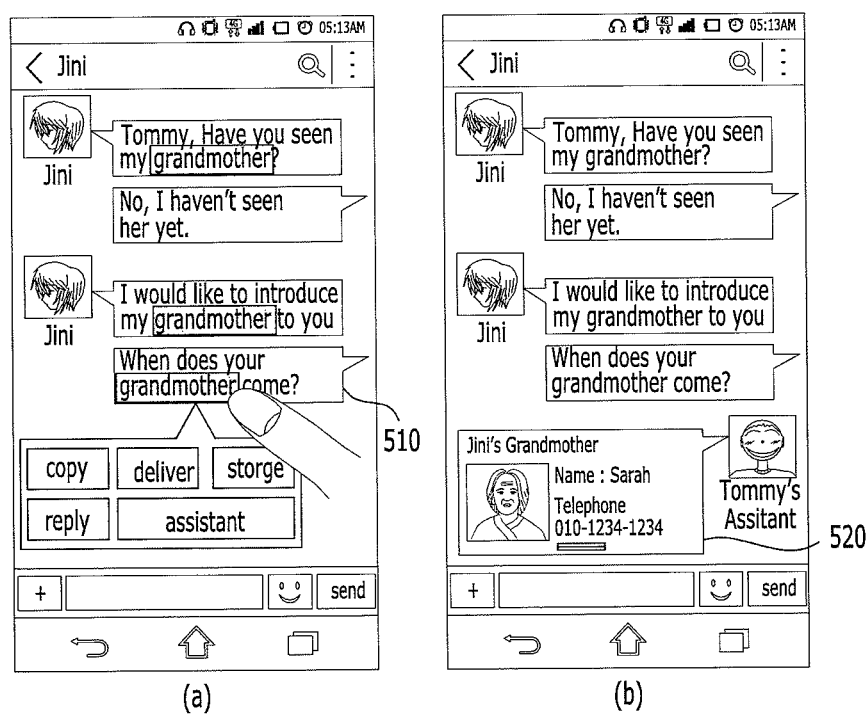
FIG. 5 is a diagram illustrating an example of outputting a search result, which is searched based on a repeatedly used keyword during the conversation, via an assistant.

Next, FIG. 5 is a diagram illustrating an example of outputting a search result, which is searched based on a repeatedly used keyword during the conversation, via the assistant.

In particular, FIG. 5(a) shows an example that such a keyword as "grandmother" repeatedly used during a conversation is included in a message 510 selected by a user. In this instance, the controller 180 can output a search result based on the repeatedly used keyword "grandmother". FIG. 5(b) shows an example that information 520 on a person indicated by "grandmother" is output via the assistant.

According to the example of FIGS. 4 and 5, if a message is selected, the message is analyzed and information for a user is output via the assistant. As a different example, if a partial content of a message is selected, the controller 180 can output information on the selected partial content as well.

Figure 6:
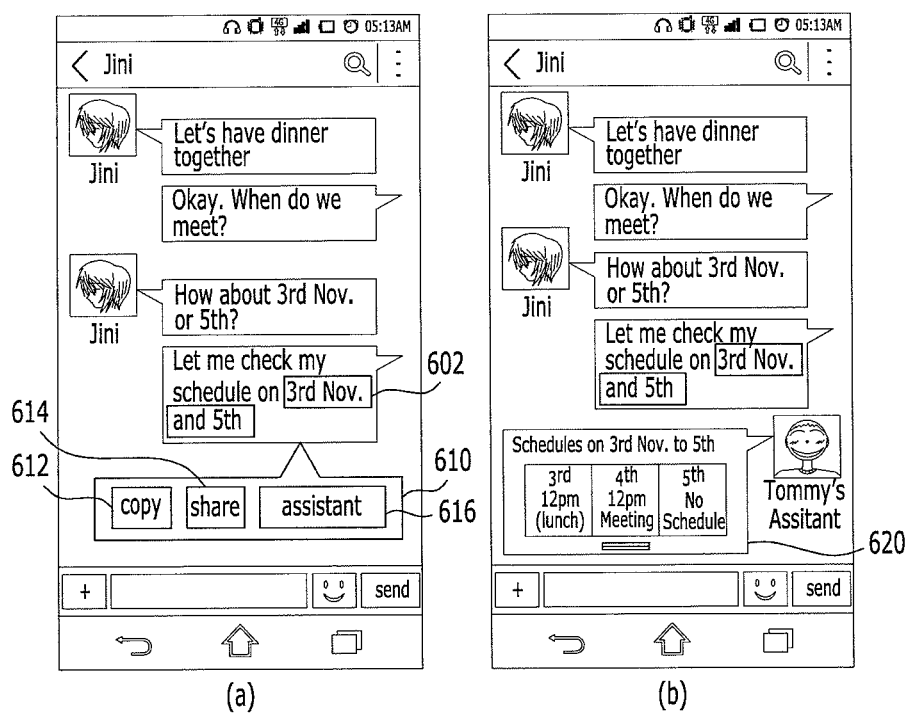
FIG. 6 is a diagram illustrating an example of an appearing assistant.

FIG. 6 is a diagram illustrating an example of an appearing assistant. If a partial content 602 of a message is selected, the controller 180 can display a menu 610 for processing the selected partial content. Referring to FIG. 6(a), the menu includes an item 612 for copying the selected content, an item 614 for sharing the selected content and an assistant item 616 for requesting information on the selected content.

If the assistant item 616 is selected from the menu, the controller 180 can output information related to the selected content via the assistant. Referring to FIG. 6(a), if the content 602 selected by a user corresponds to "$3^{rd}$ November and $5^{th}$", the controller 180 can output schedules of November 3 and November 5. FIG. 6(b) shows an example that a schedule 620 including November 3 and 5 is output.

In addition, if the part selected by the user indicates a name of a specific person, the controller 180 can output information on the specific person via the assistant. Moreover, if the part selected by the user indicates a specific place, the controller 180 can output information (e.g., a map image, a schedule of which the specific place is registered as an event occurrence place, a picture captured at the specific place, etc.) on the specific place via the assistant.

If the part selected by the user indicates a specific product, the controller 180 can output information on the specific product via the assistant. In the examples shown in FIG. 5 and FIG. 6, when a search is performed based on a keyword repeatedly used during a conversation or a part selected by a user, it may be difficult to clearly define a range of the search.

As an example, since it is difficult to define whether the repeatedly used keyword or the part selected by the user indicates a person, a place, a date or a different thing, it may take a great amount of time to get a search result based on the keyword or the part selected by the user. Hence, the controller 180 considers a context of a message and then determines a category for which a search for a selected content is performed.

Figure 7:
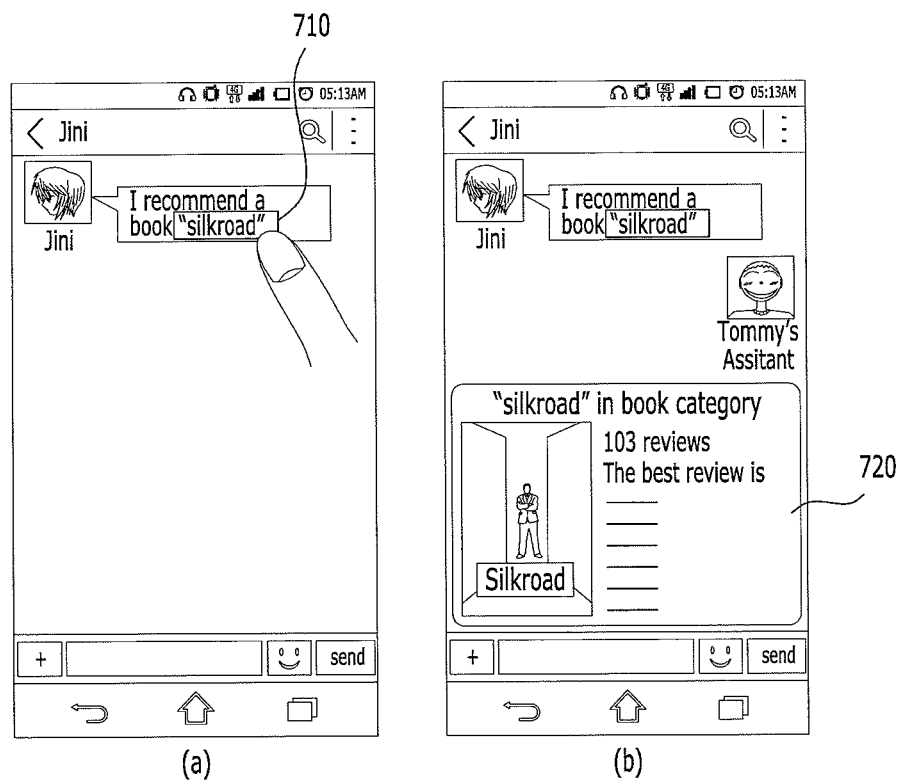
FIG. 7 is a diagram illustrating an example of an appearing assistant.

In particular, FIG. 7 is a diagram illustrating an example of an appearing assistant. FIG. 7(a) shows an example that a user selects such a word as "silk road" 710 from a message. In this instance, the controller 180 can output a search result searched based on 'silk road' via the assistant.

However, it is not clear what is indicated by the 'silk road' selected by the user. In this instance, the controller 180 can set the limit on a search category by considering a context of the message. FIG. 7(a) shows an example that there exists such a keyword as "book" indicating that "silk road" corresponds to a title of a book right before the "silk road" selected by the user. Hence, the controller 180 can extract a search result for a book category only from web search results searched based on the keyword 'silk road' and output the search result.

FIG. 7(b) shows an example that book information 720 including such a name as 'silk road' is output. As a different example, in order to clearly set a limit on a search range, the controller 180 can output a message for requesting a category limitation via the assistant.

Figure 8:
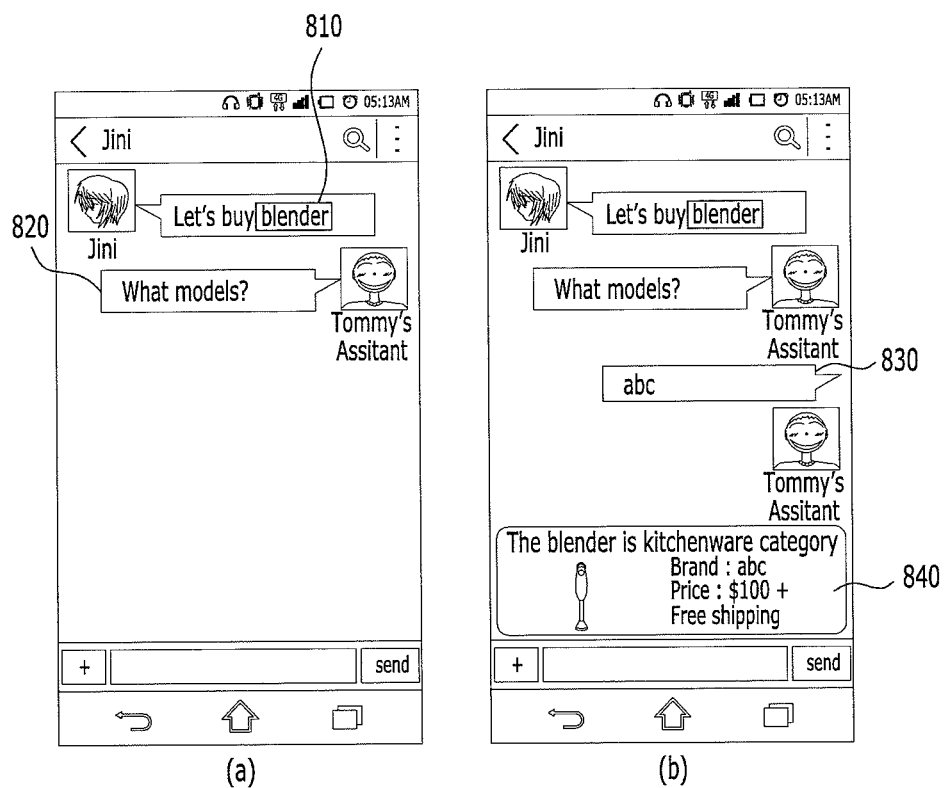
FIG. 8 is a diagram illustrating an example of an appearing assistant.

Next, FIG. 8 is a diagram illustrating an example of an appearing assistant. FIG. 8(a) shows an example that a user selects such a word 810 as "blender" from a message. In this instance, in order to narrow down a range of searching for "blender", the controller 180 can output a message 820 for asking which manufacturer of a blender to be searched via the assistant.

If a user inputs a manufacturer to be searched, as shown in an example of FIG. 8(b), the controller 180 can output a search result 840 of a blender manufactured by the manufacturer input by the user. As an example, the controller 180 can output a search result of a blender via a web search using and condition with which such a keyword as "blend" and a keyword for a manufacturer "abc" 830 input by a user are combined.

In the aforementioned embodiments, the controller 180 can perform a search using a database stored in the memory 170 or perform the search via web. In this instance, the web search can be performed via a search engine provided by a specific web site (e.g., www.google.com, www.bing.com, www.naver.com, etc.) or can also be performed using a database stored in a specific server.

As an example, if content selected by a user relates to a name of a person, the controller 180 extracts contact information of the selected name from a telephone book and can output the extracted information via the assistant. As a different example, the controller 180 can obtain information on the corresponding person from a search result searched via a prescribed search engine using a name of the person as a keyword and output the information. Alternatively, the controller 180 can receive information on a person mapped to a name of the person from a database of a prescribed server.

In FIG. 4 to FIG. 8, if a message output via a conversation window or a part of the message is selected, contents of the message are analyzed and then information for a user is output via the assistant. Similarly, the controller 180 can also output information for a user via the assistant by analyzing contents input to a text input box by a user.

Figure 9:
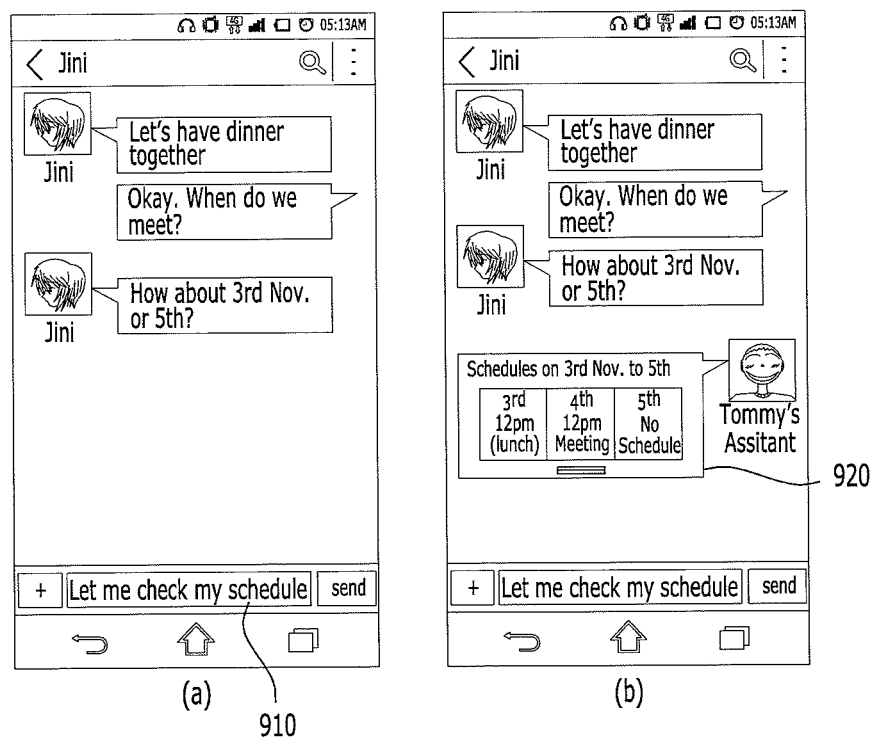
FIG. 9 is a diagram illustrating an example of outputting information necessary for a user, which is obtained by analyzing texts input in a text input window, via an assistant.

FIG. 9 is a diagram illustrating an example of outputting information for a user, which is obtained by analyzing texts input to a text input window, via an assistant. When text is input to the text input box, if a prescribed touch input is received, the controller 180 analyzes the text input to the text input box via the assistant and outputs information for a user based on the analyzed content.

Referring to FIG. 9(*a*), if text input to the text input box 910 corresponds to contents for requesting schedule check such as "Let me check my schedule", as shown in an example of FIG. 9(*b*), the controller 180 can output information 920 on schedules of the user via the assistant.

According to the examples of FIG. 4 to FIG. 9, information for a user is provided via the assistant only when an assistant item is selected from a menu, which is output after a message output via a conversation window or a part of the message is selected. Unlike the examples, if it is determined to provide a user with additional information via message content analysis, the controller 180 can control the assistant to appear.

Figure 10:
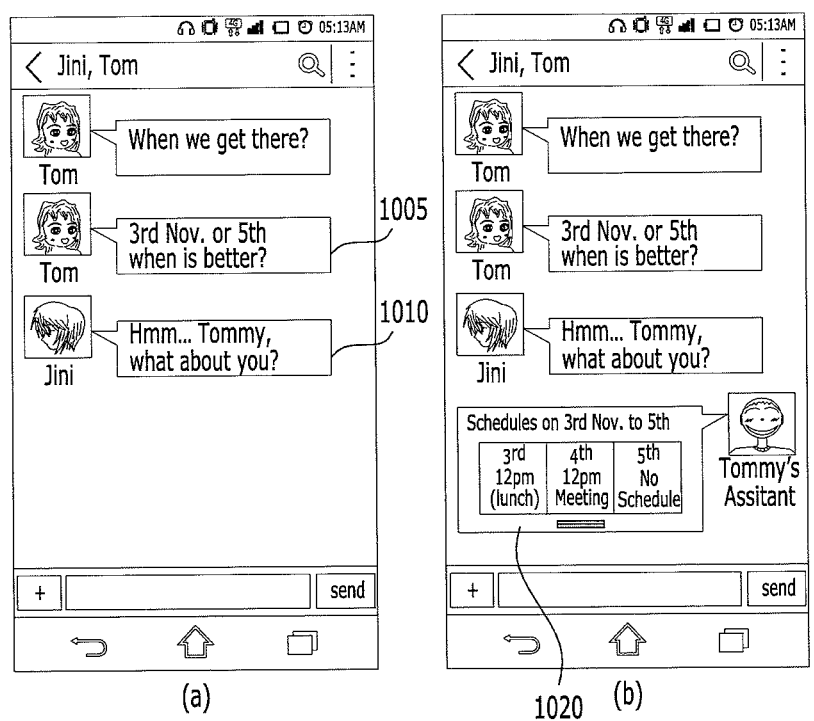
FIGS. 10 to 14 are diagrams illustrating an example of an automatically appearing assistant according to a message content.

In more detail, FIGS. 10 to 14 are diagrams illustrating an example of an automatically displaying an assistant according to message content. If a message received from a conversation partner is a question form, the controller 180 can output information corresponding to an answer via the assistant. Referring to FIG. 10(*a*), since a message 1010 received from a conversation partner includes such a question as "What about you?", the controller 180 can output information corresponding to an answer for the question via the assistant.

Referring to FIG. 10(*a*), since the message received from the conversation partner corresponds to the question "What about you?" and a conversation for checking schedule on November 3 and November 5 is made among participants participating in the conversation before the question 1005, the controller 180 can output schedules of the two days including November 3 and November 5 of a user in response to the question "What about you?".

FIG. 10(*b*) shows an example that a schedule 1020 including November 3 and November 5 is output. Hence, the user can easily write a message for answering a question with reference to an answer output via the assistant. After a question message is received from a conversation partner, although a message including an answer for the question message is transmitted but a clear answer is not made for the question, the controller 180 can output information for the response via the assistant.

Figure 11:
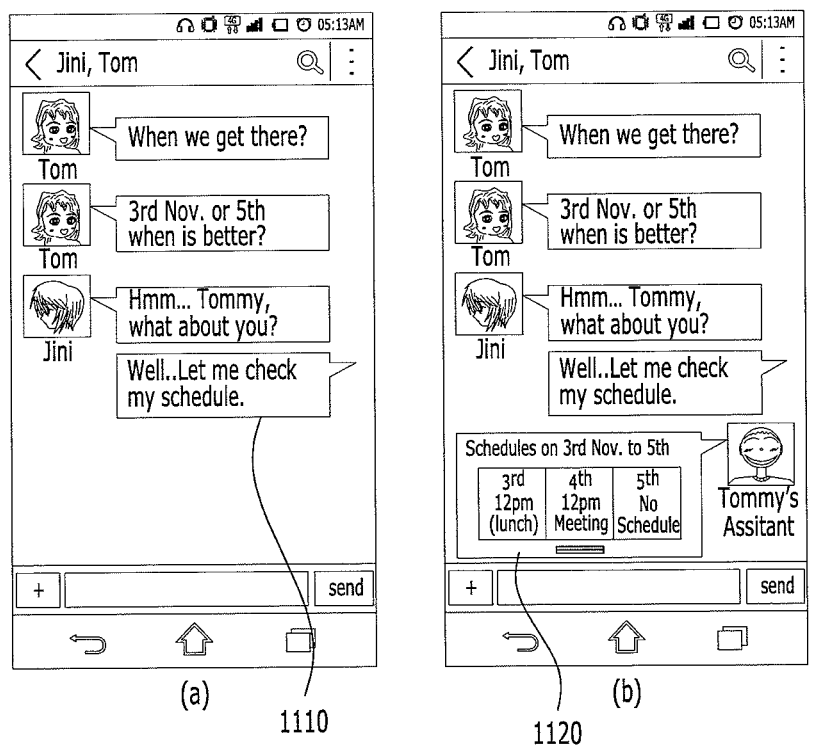

Referring to FIG. 11(*a*), after a message including a question is received from a conversation partner, if an answer 1110 transmitted to the conversation partner by a user shows such a hesitating state without immediately answering to the question as "uhm", "give me a second", "well" etc., the controller 180 can output information 1120 for assisting the answer of the user via the assistant.

FIG. 11(*b*) shows an example that a schedule 1120 including November 3 and November 5 is output to assist the user to make an answer for the question "What about you?" asking a schedule of the user on November 3 and November 5 received from the conversation partner. If an item related to a preference of a user or content for requesting a recommendation is included in conversation contents, the controller 180 can output information via the assistant.

Figure 12:
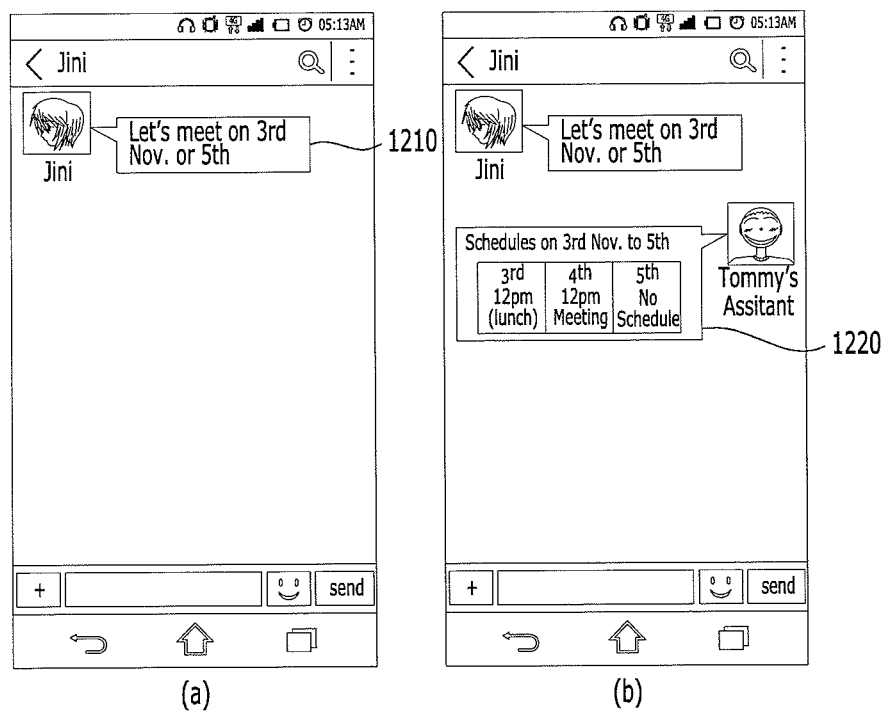

Referring to FIG. 12(*a*), if a message 1210 of contents for requesting a recommendation of a specific action is received from a conversation partner, the controller 180 can output information 1220 for responding to the recommendation. FIG. 12(*b*) shows an example that a schedule 1220 including November 3 and November 5 is output via the assistant according to the reception of the recommendation message 1210 such as "Let's meet on $3^{rd}$ November or $5^{th}$". If it is anticipated that a new schedule overlapped with a pre-registered schedule occurs during conversation, the controller 180 can output information indicating that a newly generated schedule is overlapped with a pre-registered schedule via the assistant.

Figure 13:
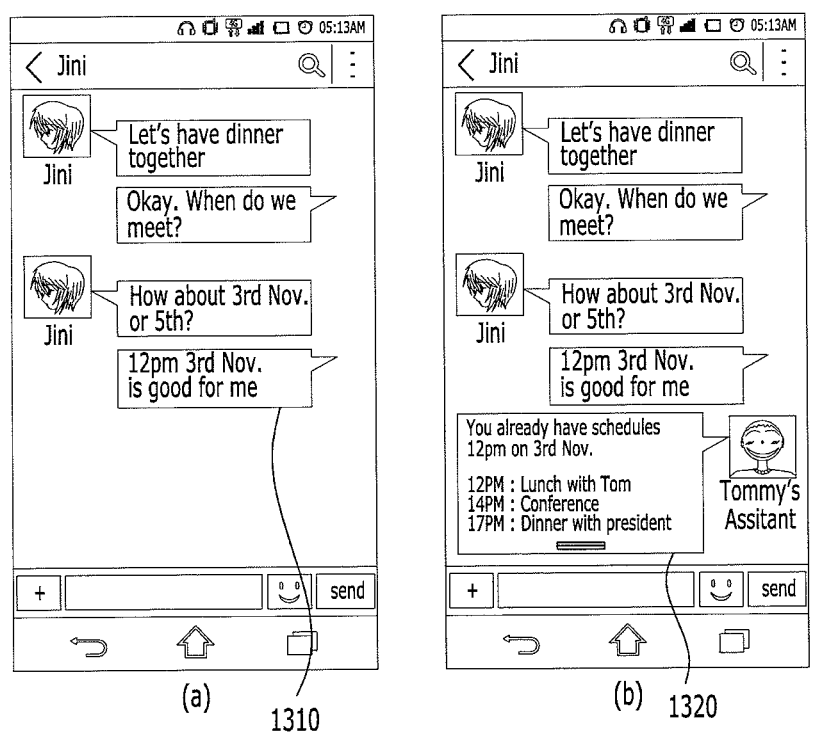

Referring to FIG. 13(*a*), if a message 1310 intends to add a new schedule to 12:00 PM November 3 but a pre-registered schedule exist on 12:00 PM November 3, as shown in FIG. 13(*b*), the controller 180 can output information 1320 on schedules overlapped on the corresponding timeline. Hence, a user can prevent overlapped schedules from being registered at an identical timeline. If a prescribed keyword is repeated equal to or more than prescribed times during conversation, the controller 180 can output information on the repeatedly used vocabulary via the assistant.

Figure 14:
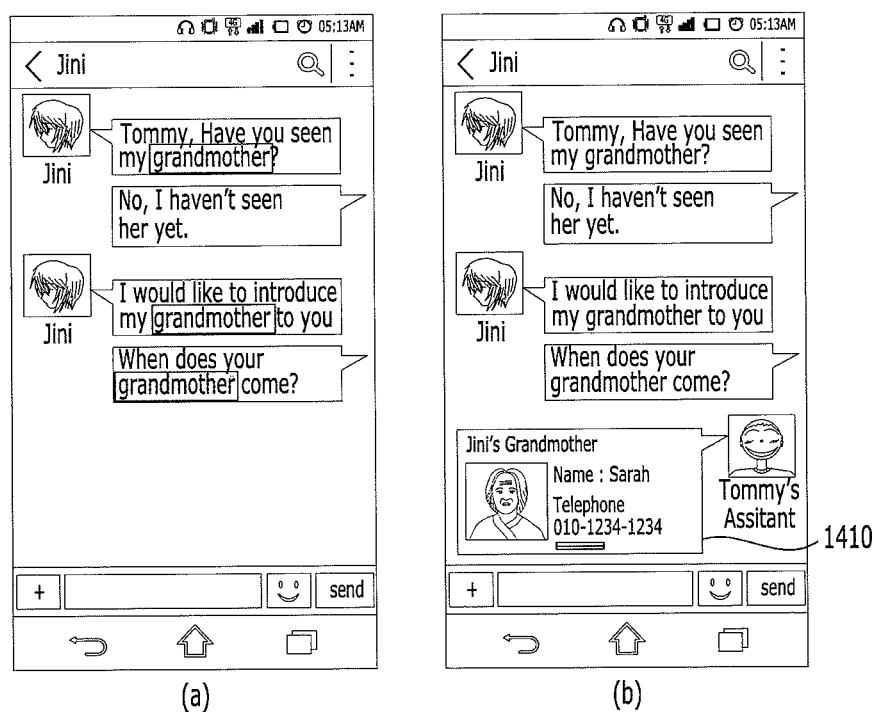

Referring to FIG. 14(*a*), if such a vocabulary as "grandmother" is repeatedly used, as shown in FIG. 14(*b*), the controller 180 can output information 1410 on a person indicated by the "grandmother" via the assistant. FIG. 14(*b*) shows an example that a picture, a name and a telephone number of the person indicated by the "grandmother" are output.

FIG. 4 to FIG. 14 shows examples that information via the assistant is determined by analyzing a message received from a conversation partner or a message transmitted to the conversation partner by a mobile terminal. As a different example, when a user intends to check a plurality of messages received from a conversation partner, the controller 180 can output the assistant.

Figure 15:
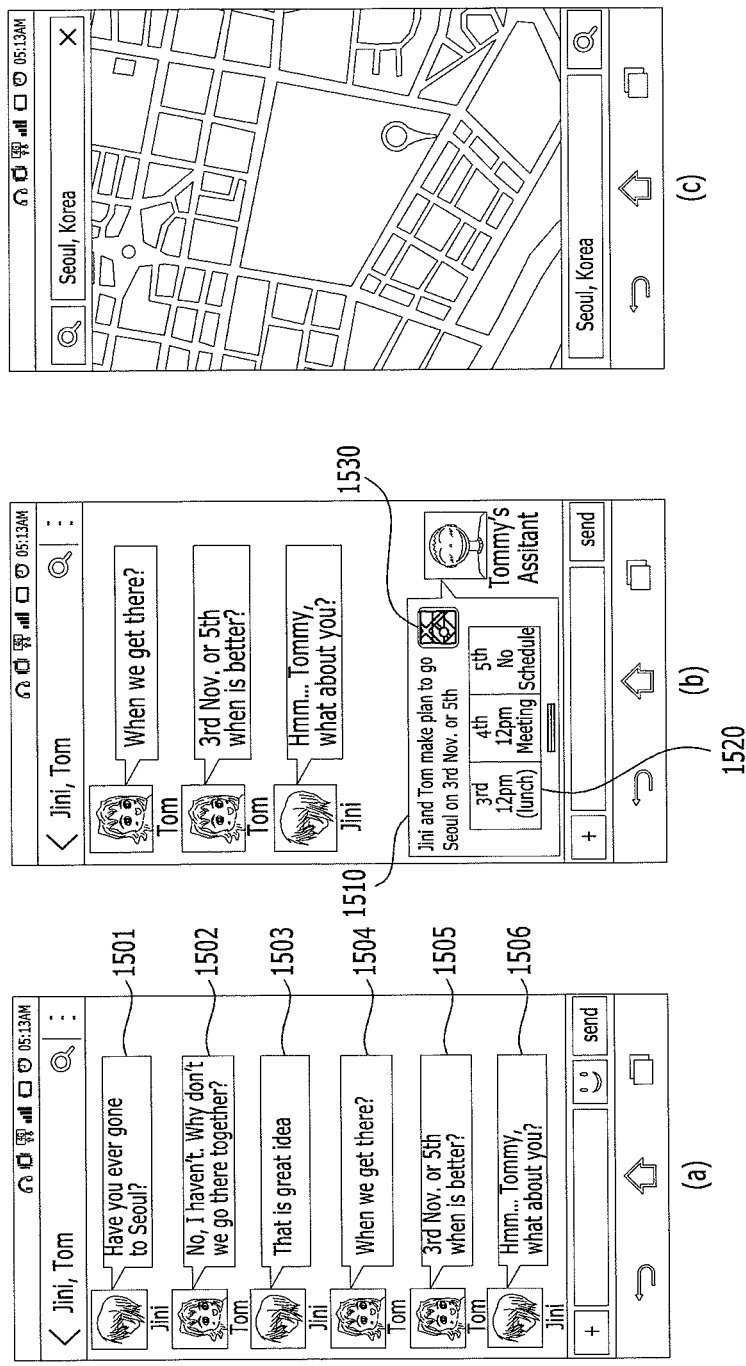
FIG. 15 is a diagram illustrating an example of an appearing assistant.

FIG. 15 is a diagram illustrating an example of an appearing assistant. When a plurality of messages are received from a conversation partner, if a user input intending to output a conversation window is received, as shown in an example of FIG. 15(*a*), the controller 180 can output the messages 1501 to 1506 received from the conversation partner via the conversation window. In this instance, if the messages received from the conversation partner are equal to or greater than a prescribed number, the controller 180 can output summary information on a plurality of the received messages via the assistant.

FIG. 15(*b*) shows an example that schedule information 1520 on dates included in the summary information 1510 and a map icon 1530 linked with a location included in the summary information 1510 are output together with the summary information 1510 in which contents of a plurality of the received messages are implicitly summarized. If the map icon 1530 shown in FIG. 15(*b*) is touched, as shown in an example of FIG. 15(*c*), the controller 180 can output a map for displaying the place mentioned in the summary information.

According to the example of FIG. 15, the assistant appears when a user intends to check a plurality of messages received from a conversation partner. However, if it is difficult to output all of at least one or more messages newly received from the conversation partner, the controller 180 can control the assistant to appear without scrolling the display unit 151.

Unlike the aforementioned examples, if an input for requesting information is received, the controller 180 can output information for a user via the assistant. In this instance, the request of the user can be received via a microphone 122 or text input on a text input box.

Figure 16:
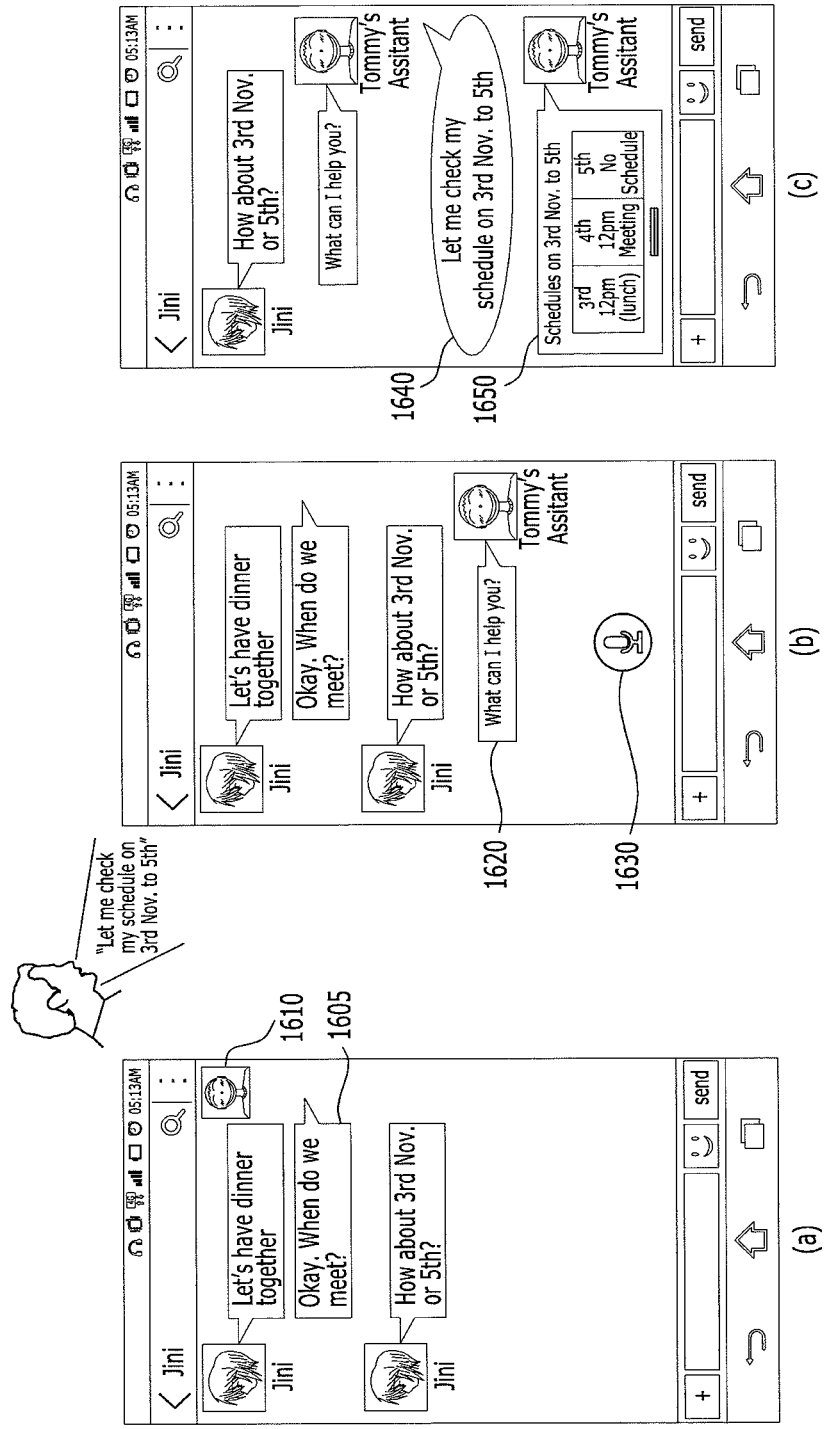
FIG. 16 is a diagram illustrating an example of outputting an answer in response to a request of a user via an assistant.

In more detail, FIG. 16 is a diagram illustrating an example of outputting an answer in response to a request of a user via an assistant. If a user input for calling the assistant is received, the controller 180 makes the assistant appear in a conversation room and can output the predetermined message via the assistant. In this instance, a predetermined user input may correspond to touching an icon for calling the assistant or pushing a send button when a text input box is empty, by which the present invention may be non-limited.

FIG. 16(*a*) shows a state that the icon 1610 for calling the assistant is output. If an assistant icon is touched, the controller 180 makes the assistant appear and can output a predetermined message. FIG. 16(*b*) shows an example that a message such as "What can I help you?" is output via the assistant. In this instance, the controller 180 can output voice data, which is TTS converted from the predetermined message, while outputting the predetermined message.

If the assistant icon is touched, the controller 180 can activate a microphone 122 while outputting the predetermined message via the assistant. The controller 180 can display an indicator indicating the microphone 122 is activated via the display unit 151. FIG. 16(*b*) shows an example that a microphone icon 1630 indicating that the microphone 122 is activated is output.

If voice of a user is input when the microphone 122 is activated, the controller 180 outputs text 1640, which is STT (speech to text) converted from the voice of the user, and can output response information via the assistant in response to the voice of the user. In addition, the controller 180 can output information requested by the user voice via the assistant. In this instance, the controller 180 can not transmit the text, which is STT converted from the voice of the user, to a conversation partner.

That is, the conversation partner receives messages except the text, which is STT converted from the voice of the user, and the information output via the assistant only among messages output via a conversation window. Referring to FIG. 16(*c*), if voice input by a user corresponds to a request requesting for schedule information for a specific period such as "Let me check my schedule on $3^{rd}$ November to $5^{th}$", the controller 180 can output schedule information of a period requested by the user, i.e., schedule information 1650 between November 3 and November 5.

That is, if a user voice is input after the assistant appears, the controller 180 can output information requested by the voice of the user via the assistant. Hence, the user voice input after the assistant appears is utilized for a conversation with the assistant instead of a conversation partner.

In order to distinguish a message transmitted to a conversation partner from a message for requesting information to the mobile terminal (i.e., the assistant), the controller 180 can control the both messages to be visually distinctively displayed. Specifically, the controller 180 can control the both messages to be visually distinctively displayed by differentiating color, a shape or the like of the both messages.

As shown in FIGS. 16(*b*) and (*c*), the message 1605 transmitted to the conversation partner is displayed in a rectangular conversation box and the message 1640 for requesting information to the assistant is displayed in a conversation box of a circular form. Assume that the message transmitted to the conversation partner is displayed in a rectangular conversation box and the message for requesting information to the assistant is displayed in a conversation box of a circular form in the following drawing.

The controller 180 can determine a main entity for delivering user voice according to an object touched by a user. As an example, if a user inputs voice of the user while touching identification information of a conversation partner or a message received from the conversation partner, the controller 180 can control text, which is STT converted from the voice input by the user, to be transmitted to the conversation partner (or, the controller can insert the STT converted text into a text input box to transmit the text to the conversation partner). Meanwhile, if the user inputs the voice of the user while touching identification information of the assistant, the controller 180 can output information requested by the voice of the user via the assistant.

Figure 17:
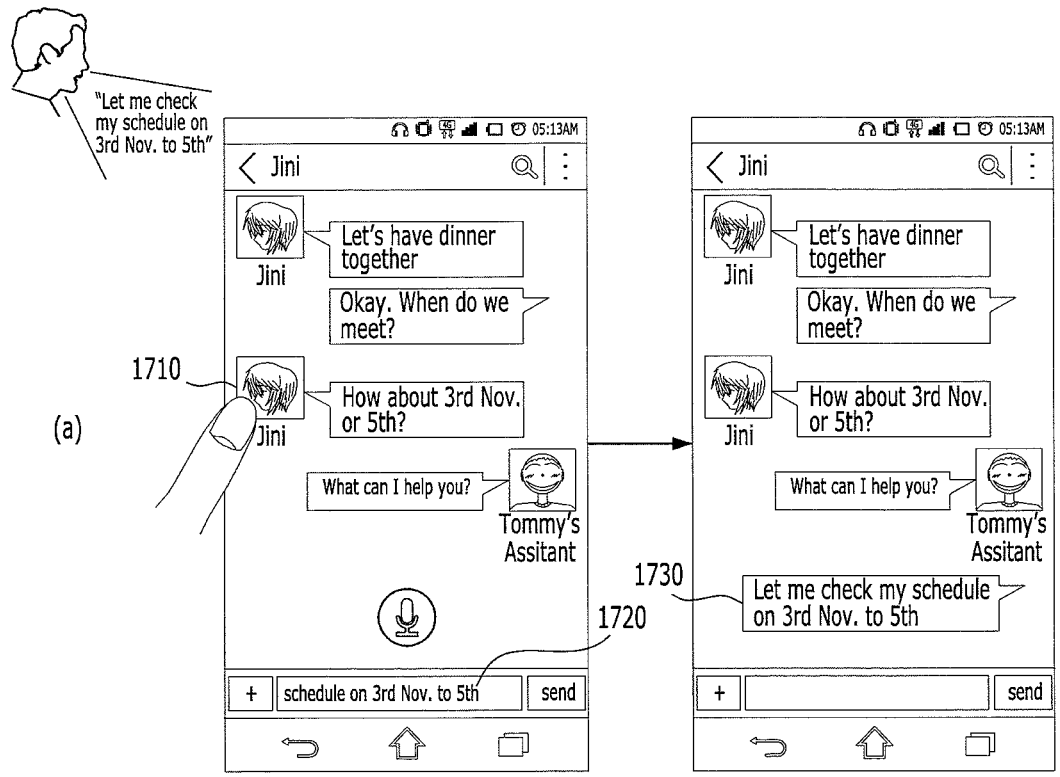
FIG. 17 is a diagram illustrating explaining a voice processing according to a point touched by a user.
Figure 17:
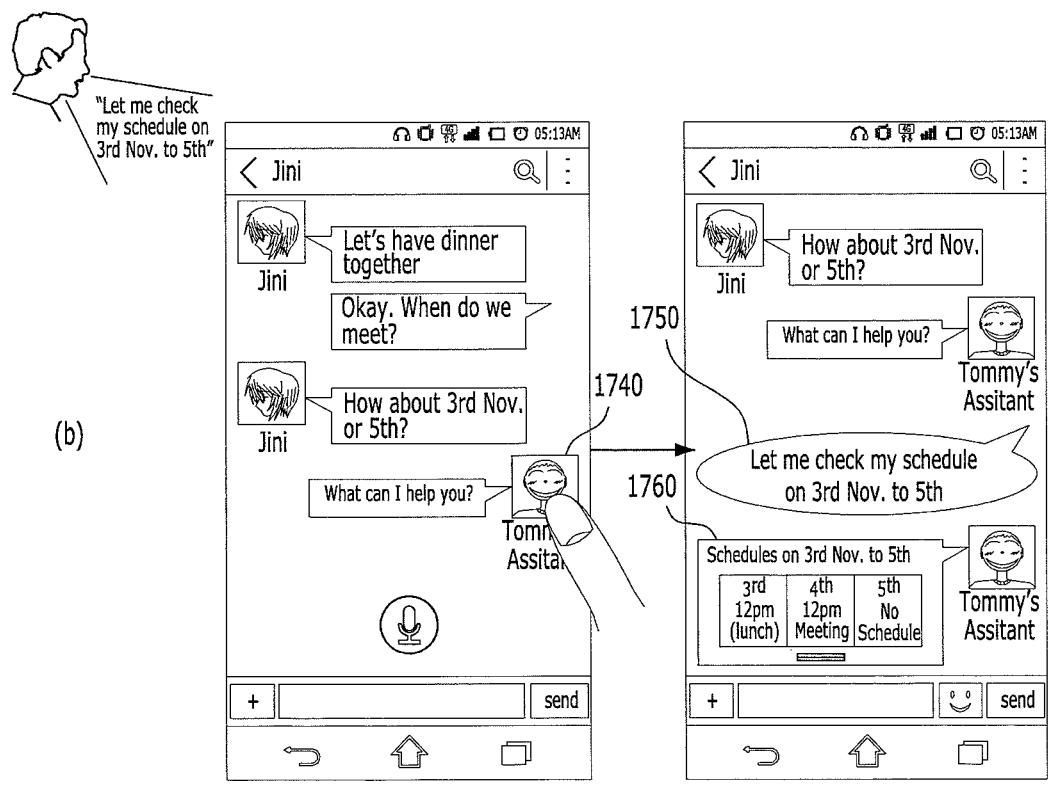

Next, FIG. 17 is a diagram illustrating a voice processing according to a point touched by a user. Referring to FIG. 17(*a*), if a user inputs voice while touching identification information 1710 of a conversation partner, the controller 180 can control text, which is STT converted from the voice of the user, to be transmitted to the conversation partner or control the STT converted text to be inserted into a text input box 1720.

FIG. 17(*a*) shows an example that such text, which is STT converted from the voice of the user, as "Let me check my schedule on $3^{rd}$ November to $5^{th}$" is output on the text input box. Subsequently, if a send button is touched, the controller 180 can transmit a message 1730 including the text displayed on the text input box to the conversation partner.

Referring to FIG. 17(*b*), if the user inputs voice of the user while touching identification information 1740 of the assistant, the controller 180 can output information requested by the voice of the user via the assistant. In this instance, the controller 180 can output text 1750, which is STT converted from the voice input by the user, via the display unit 151.

FIG. 17(*b*) shows an example that schedule information 1760 between November 3 and November 5 is output via the assistant according to a request of the user voice. Although FIG. 17 is depicted as touching the identification information of the conversation partner or the identification information of the assistant, a touch region is not limited by the contents described in FIG. 17.

For example, voice input while a prescribed first region of a conversation window is touched may be used for transmitting a message to a conversation partner and voice input while a second region except the first region is touched may be used for requesting information. As a different example, voice input while a display unit is touched may be used for transmitting a message to a conversation partner (or outputting information via the assistant) and voice input while a display unit is not touched may be used for outputting information via the assistant (or transmitting a message to a conversation partner).

As a different example, if a predetermined text is not included in text input on the text input box, the controller 180 transmits the text to a conversation partner. If the predetermined text is included in the text input on the text input box, the controller can output information requested by the text via the assistant without transmitting the text to the conversation partner.

Figure 18:
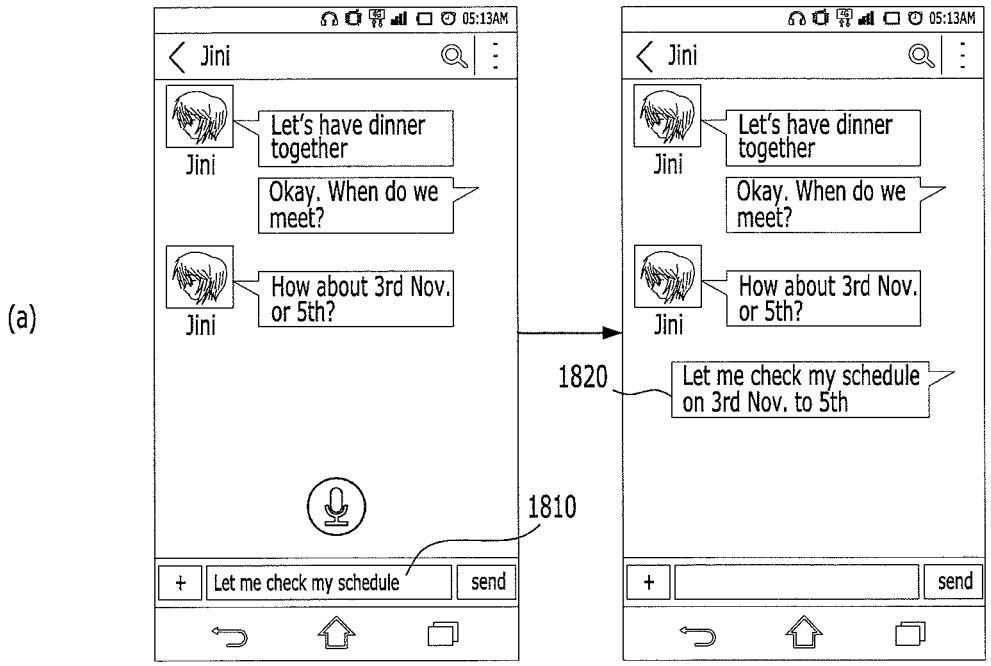
FIG. 18 is a diagram illustrating explaining a processing of text input by a user.
Figure 18:
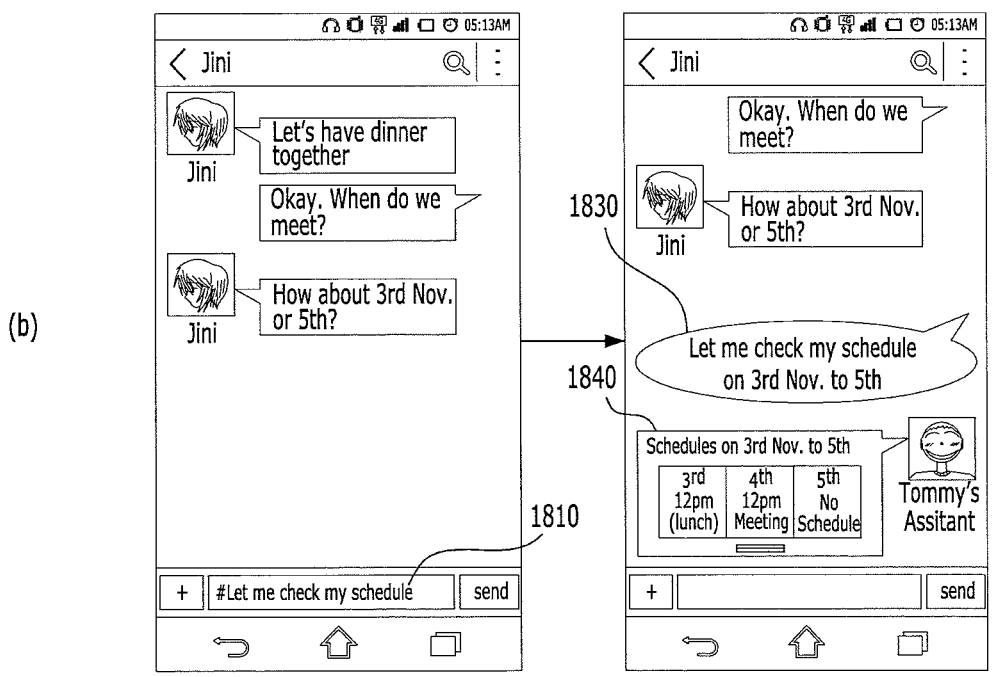

FIG. 18 is a diagram illustrating a processing of text input by a user. For clarity, assume that a predetermined text corresponds to "#". Referring to FIG. 18(a), when the predetermined text "#" is not included in text input on a text input box 1810, if a user touches or presses a send button, the controller 180 can transmit a message including the text input on the text input box to a conversation partner.

As an example, FIG. 18(a) shows an example that such a message 1820 as "Let me check my schedule on $3^{rd}$ November to $5^{th}$" is transmitted to the conversation partner. On the contrary, when the predetermined text "#" is included in the text input on the text input box 1810, if a user pushes a send button, the controller 180 can output information, which is requested by the text input on the text input box 1810, via the assistant. In this instance, a message including the text input on the text input box 1810 may not be transmitted to the conversation partner.

FIG. 18(b) shows an example that schedule information 1840 between November 3 and November 5 is output via the assistant in response to such a request 1830 as "Let me check my schedule on $3^{rd}$ November to $5^{th}$" of the user.

However, since transmitting a message including a predetermined text (e.g., "#") to a conversation partner may occur, the controller 180 can output information requested by the message including the predetermined text via the assistant only when the predetermined text is positioned at the start or the end of the message.

That is, although the predetermined text is inserted into a message, if the predetermined text is inserted into the middle of the message, the controller 180 can transmit the message to the conversation partner. The controller 180 can also transmit information output via the assistant to a conversation partner based on a user input.

Figure 19:
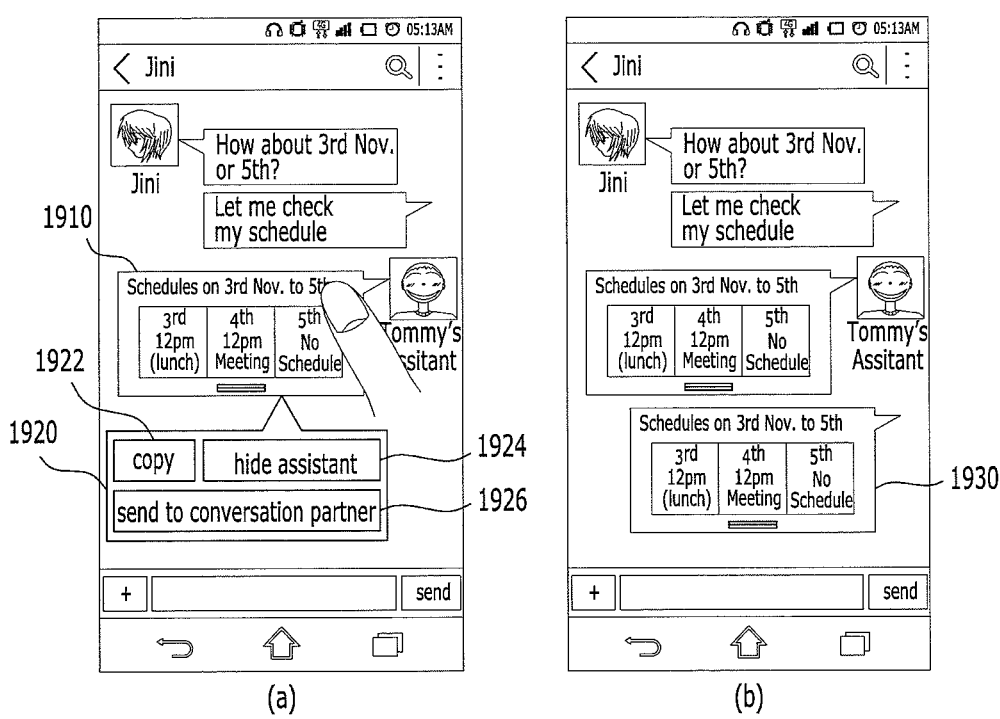
FIG. 19 is a diagram illustrating an example of transmitting information output via an assistant to a conversation partner.

FIG. 19 is a diagram illustrating an example of transmitting information output via an assistant to a conversation partner. If a user input touching information 1910 output via the assistant is received, the controller 180 can output a menu 1920 for processing the selected information.

FIG. 19(a) shows an example that a menu 1920 including an item 1922 for copying output information, an item 1924 for terminating output of information and an item 1926 for transmitting output information to a conversation partner is output. If the item 1926 for transmitting output information to the conversation partner is selected from the menu shown in FIG. 19(a), as shown in an example of FIG. 19(b), the controller 180 can transmit a message 1930 including information used via the assistant to the conversation partner.

In addition, if the item for transmitting output information to the conversation partner is selected after a part of information output via the assistant is selected, the controller 180 can transmit a part of the selected information to the conversation partner. As an example, if the item for transmitting output information to the conversation partner is selected after a date is selected from schedules shown in FIG. 19(a), the controller 180 can transmit a schedule of the selected date to the conversation partner.

If three or more participants participate in a conversation, the controller 180 can transmit information output via the assistant to a part of a plurality of conversation partners only. As an example, if a conversation partner A and a conversation partner B including a user participate in a conversation, the controller 180 can transmit the information output via the assistant to one of the conversation partner A and the conversation partner B only.

FIG. 19 shows an example that a menu is called to transmit information output via the assistant to a conversation partner and an item for transmitting the information to the conversation partner is selected. However, this is just an example of a method of transmitting information. The present invention is non-limited by the aforementioned method.

As an example, if the information output via the assistant is received by a user input dragging identification information (e.g., a profile image of a conversation partner or a name of the conversation partner) of the conversation partner (or a user input dragging a pointer and releasing the pointer), the controller 180 can transmit the information to the conversation partner. As a different example, the controller 180 can insert the information output via the assistant into a text input box. In this instance, a user can transmit the information to a conversation partner by modifying the information inserted into the text input box or adding additional information to the text input box.

Figure 20:
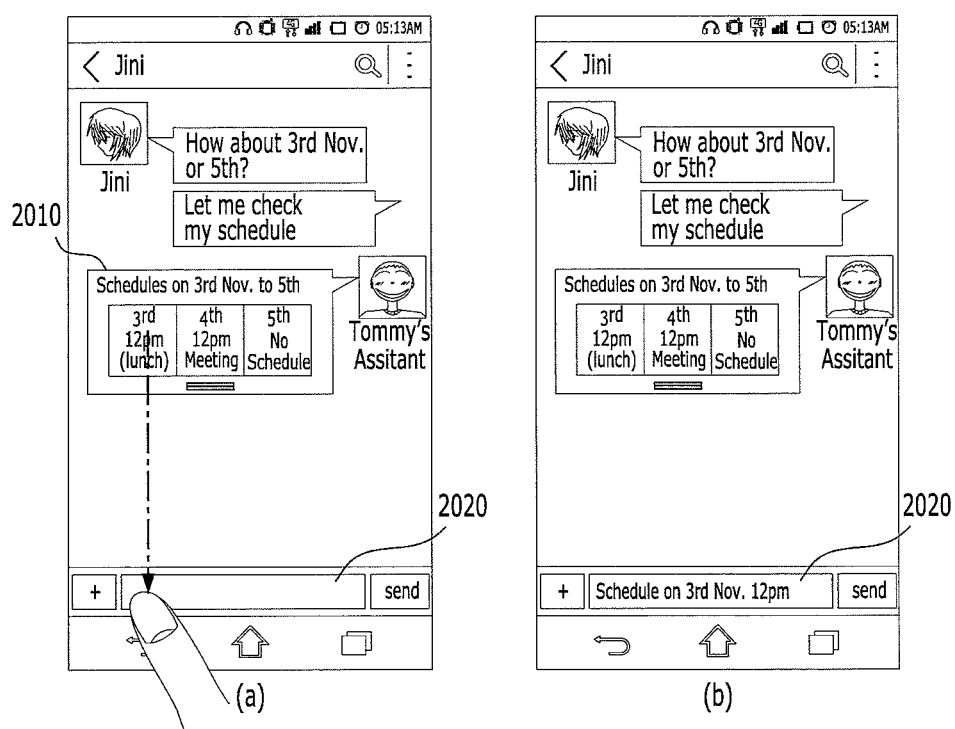
FIG. 20 is a diagram illustrating an example of inserting information output via an assistant into a text input window.

FIG. 20 is a diagram illustrating an example of inserting information output via an assistant into a text input window. Referring to FIG. 20(a), if a user input for dragging information 2010 output via the assistant into a text input box (or a user input for dragging a pointer and releasing the pointer) is received, as shown in an example of FIG. 20(b), the controller 180 can insert the information output via the assistant into the text input box 2020.

FIGS. 20(a) and (b) show an example that a pointer selecting November 3 from schedules is dragged into the text input box 2020 and a schedule of November 3 is inserted into the text input box 202. As a different example, the controller 180 can convert the information output via the assistant into a message to be transmitted to a conversation partner.

Figure 21:
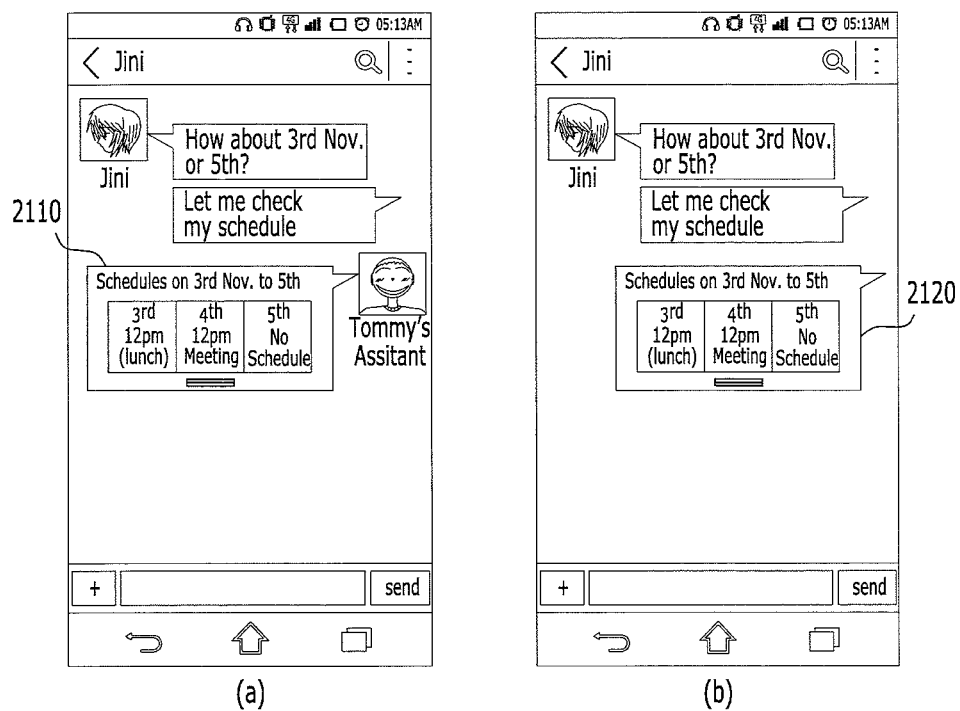
FIG. 21 is a diagram illustrating an example of converting information output via an assistant into a message to be transmitted to a conversation partner.

FIG. 21 is a diagram illustrating an example of converting information output via an assistant into a message to be transmitted to a conversation partner. If a user input touching information 2110 output via the assistant for more than prescribed time is received, the controller 180 can control output of the information output via the assistant to be terminated while transmitting the information 2110 output via the assistant to a conversation partner as it is.

Then, as shown in examples of FIGS. 21(a) and (b), such a visual effect as a message 2120, which is transmitted to the conversation partner by being converted from the information 2110 output via the assistant, may occur. The controller 180 can output information on a conversation partner via the assistant. In this instance, the information on the conversation partner may include a post uploaded to SNS by the conversation partner, a message transmitted to a user by the conversation partner using a different application, schedule information of the conversation partner, and the like, by which the present invention may be non-limited.

Figure 22:
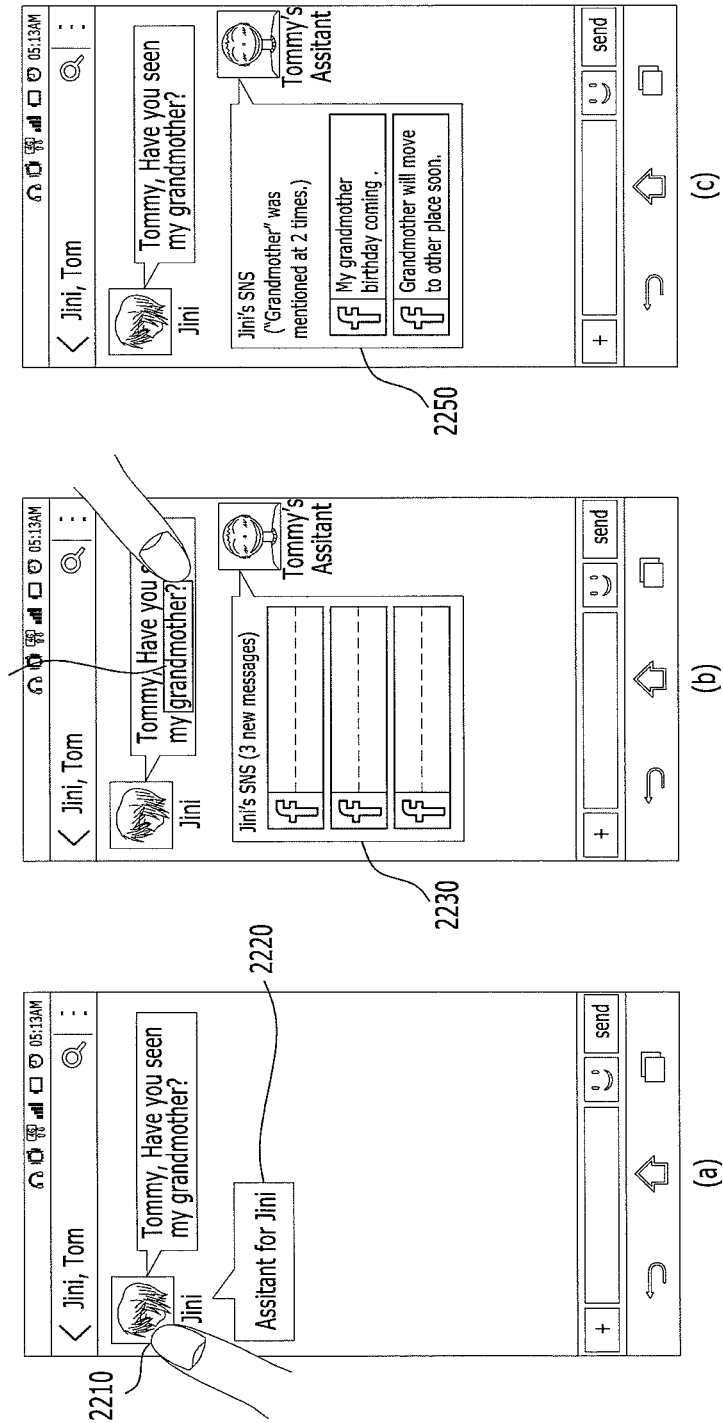
FIG. 22 is a diagram illustrating an example of outputting information on a conversation partner.

FIG. 22 is a diagram illustrating an example of outputting information on a conversation partner. If a user input touching identification information 2210 (e.g., a profile image of a conversation partner) of the conversation partner is received, as shown in an example of FIG. 22(a), the controller 180 can display a menu 2220 for calling the assistant. If an assistant item shown in FIG. 22(a) is touched, the controller 180 can output information on the conversation partner via the assistant.

FIG. 22(b) shows an example that posts 2330 uploaded to SNS by the conversation partner are output. In this instance, if a part 2240 of conversation contents is selected, the controller 180 can output posts including the selected content only by filtering the posts. As an example, if "grandmother" 2240 is selected from a message of the conversation partner, as shown in an example of FIG. 22(c), the controller 180 can output posts 2250 including the "grandmother" by filtering the posts.

In addition, in the example shown in FIG. 22(b), if it is difficult to output all SNS postings since the number of postings uploaded by the conversation partner to SNS is too many, the controller 180 can output a message indicating that it is unable to output all search results due to too many search results instead of the outputting the SNS postings of the conversation partner.

Referring to FIG. 22(c), in this instance, the controller 180 can output the information of the conversation partner to be output only when a keyword to be searched is limited.

In the aforementioned embodiments, the assistant is described as being positioned at a status similar to a participant participating in a conversation. In particular, if identification information indicating that information is output via the assistant is output in the vicinity of the information output via the assistant, a user may have such a feeling as talking with the assistant. Unlike the example shown in the drawing, the controller 180 divides the display unit 151 into two regions, continuously outputs a conversation window on a region and can output information requested by a user on another region.

Figure 23:
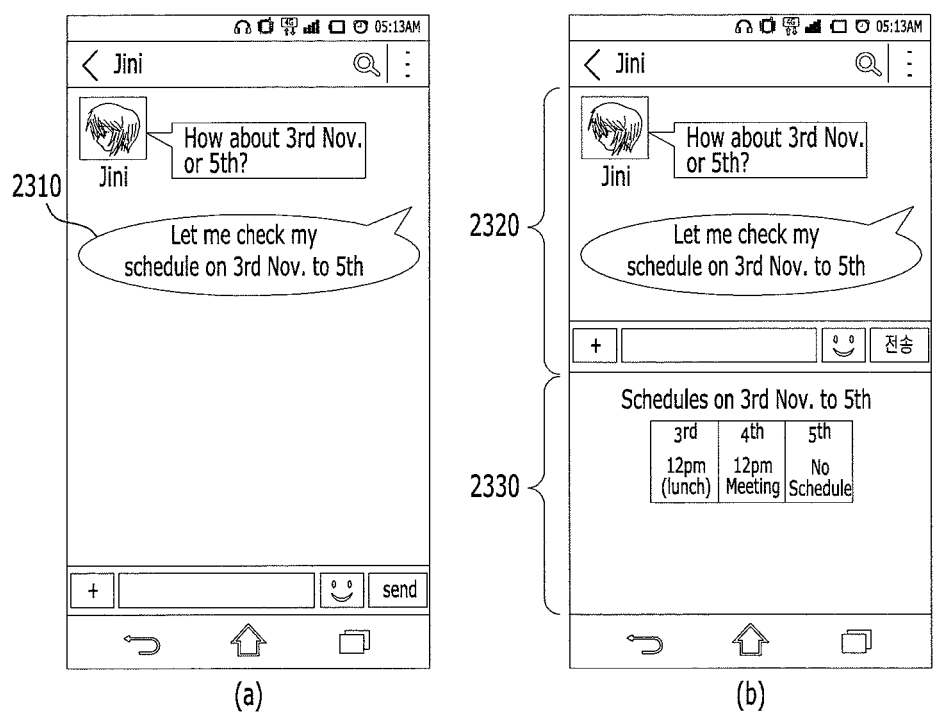
FIG. 23 is a diagram illustrating an example of outputting information requested by a user.

FIG. 23 is a diagram illustrating an example of outputting information requested by a user. Referring to FIG. 23(a), if a user input 2310 requesting for providing prescribed information is received while a conversation window is output, the controller 180 divides the display unit 151 into two regions and can output the conversation window on a region 2320 and information requested by a user on another region 2330.

FIG. 23(b) shows an example that the conversation window is output via an upper region 2320 and schedule information requested by the user is output via a bottom region 2330 among two regions divided by the upper region and the bottom region. In addition, a message requesting for information to the assistant can also be displayed via the bottom region 2330. Moreover, if the message or the information output via the bottom region is dragged into the upper region, the controller can transmit the dragged information or the information to a conversation partner. On the contrary, if the message output via the upper region is dragged into the bottom region, the controller can output information related to the dragged message.

Accordingly. embodiments of the invention provide several advantages. For example. a mobile terminal enhancing user convenience is provided. A mobile terminal capable of providing information for a user during the conversation and a method of controlling therefor are also provided. In addition, a mobile terminal capable of providing information for a user using a virtual person not participating in the conversation without interrupting the conversation and a method of controlling therefor are provided.

According to one embodiment of the present invention, the aforementioned method (operation flowchart) can be implemented by a code readable by a processor in a program or a medium in which a program (or application) is recorded. Examples of the medium readable by the processor include a ROM, a RAM, a CD-ROM, a magnetic tape, a floppy disk, an optical data storing device and the like. The medium can also be implemented in a form of a carrier wave (e.g., transmission via the Internet).

The configuration and method of the aforementioned embodiments are not limitedly applied to the mobile terminal 100 mentioned in the present invention. All or a part of each of the embodiments can be configured by being selectively combined with each other to achieve various modifications in the embodiments.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. A mobile terminal, comprising:
 a wireless communication unit configured to wirelessly communicate with a conversation partner;
 a display unit configured to display a conversation window displaying messages transceived with the conversation partner; and
 a controller configured to:
 control a virtual assistant to output information within the conversation window and not transmit the information to the conversation partner,
 in response to a received message from the conversation partner containing a question, control the virtual assistant to output information including an answer to the question within the conversation window and adjacent to the question from the conversation partner without transmitting the information to the conversation partner,
 in response to a selection of a message among the displayed messages, display the virtual assistant in the conversation window and control the virtual assistant to output information related to the selected message, and
 in response to a user request, control the virtual assistant to output information related to the user request.

2. The mobile terminal of claim 1, wherein the virtual assistant is displayed with an image of a virtual person.

3. The mobile terminal of claim 1, wherein in response to a text string indicating a specific date being contained in the selected message, the controller is further configured to control the virtual assistant to display schedule information about the specific date.

4. The mobile terminal of claim 3, wherein in response to the text string indicating the specific date not being contained in the selected message, the controller is further configured to use a date contained in a message received before or after the selected message, as the specific date.

5. The mobile terminal of claim 1, further comprising:
 a microphone configured to receive the user request,
 wherein the controller is further configured to:
 in response to the user speaking into the microphone while a first region of the conversation window is touched, transmit a message containing text converted from the user speaking to the conversation partner, and
 in response to the user speaking into the microphone while a second region of the conversation window is touched, control the virtual assistant to output information based on a meaning of words the user is speaking into the microphone.

6. The mobile terminal of claim 5, wherein the controller is further configured to display the message transmitted to the conversation partner in the conversation window.

7. The mobile terminal of claim 6, wherein the message transmitted to the conversation partner and the information output from the virtual assistant are visually distinguished from each other in the conversation window.

8. The mobile terminal of claim 1, wherein the controller is further configured to:
   in response to predetermined identification text not being contained in text input to a text input box of the conversation window, transmit a message containing the text to the conversation partner, and
   in response to the predetermined identification text being contained in the text input to the text input box of the conversation window, control the virtual assistant to output information corresponding to the text.

9. The mobile terminal of claim 1, wherein the controller is further configured to:
   display a plurality of unread reception messages received from the conversation partner, and
   control the virtual assistant to display summary information of the unread plurality of the reception messages.

10. The mobile terminal of claim 1, wherein in response to a user input touching the information output by the virtual assistant, the controller is further configured to transmit the information to the conversation partner.

11. The mobile terminal of claim 1, wherein the information comprises postings posted on an SNS (social network service) account of the conversation partner.

12. The mobile terminal of claim 11, wherein in response to a part of the messages being selected, the controller is further configured to only output postings containing the selected part among the postings.

13. A method of controlling a mobile terminal, the method comprising:
   wirelessly communicating, via a wireless communication unit, with a conversation partner;
   displaying, via a display unit, a conversation window displaying messages transceived with the conversation partner;
   in response to a selection of a message among the displayed messages, displaying a virtual assistant in the conversation window and controlling, via a controller, the virtual assistant to output information related to the selected message;
   in response to a user request, controlling, via the controller, the virtual assistant to output information related to the user request;
   controlling, via the controller, the virtual assistant to output the information within the conversation window and not transmit the information to the conversation partner; and
   in response to a received message from the conversation partner containing a question, controlling, via the controller, the virtual assistant to output information including an answer to the question within the conversation window and adjacent to the question from the conversation partner without transmitting the information to the conversation partner.

14. The method of claim 13, wherein the virtual assistant is displayed with an image of a virtual person.

15. The method of claim 13, wherein in response to a text string indicating a specific date being contained in the selected message, the method further comprises controlling the virtual assistant to display schedule information about the specific date.

16. The method of claim 15, wherein in response to the text string indicating the specific date not being contained in the selected message, the method further comprises using a date contained in a message received before or after the selected message, as the specific date.

\* \* \* \* \*